(12) United States Patent
Geil et al.

(10) Patent No.: US 12,335,297 B2
(45) Date of Patent: *Jun. 17, 2025

(54) SYSTEMS AND METHODS FOR RAPIDLY GENERATING SECURITY RATINGS

(71) Applicant: BitSight Technologies, Inc., Boston, MA (US)

(72) Inventors: Ethan Geil, Concord, MA (US); Bryan Turcotte, Waltham, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,959

(22) Filed: Aug. 24, 2023

(65) Prior Publication Data

US 2024/0129332 A1 Apr. 18, 2024

Related U.S. Application Data

(60) Continuation of application No. 18/158,594, filed on Jan. 24, 2023, now Pat. No. 11,777,983, which is a
(Continued)

(51) Int. Cl.
*H04L 9/40* (2022.01)
*G06F 16/22* (2019.01)
(Continued)

(52) U.S. Cl.
CPC ...... *H04L 63/1433* (2013.01); *G06F 16/2246* (2019.01); *G06F 16/24532* (2019.01); *G06F 16/2455* (2019.01)

(58) Field of Classification Search
CPC ............. H04L 63/1433; G06F 16/2246; G06F 16/24532; G06F 16/2455
See application file for complete search history.

(56) References Cited

U.S. PATENT DOCUMENTS

| 5,867,799 A | 2/1999 | Lang et al. |
| 6,016,475 A | 1/2000 | Miller et al. |

(Continued)

FOREIGN PATENT DOCUMENTS

| WO | WO-2017/142694 A1 | 1/2019 |
| WO | WO-2019/023045 A1 | 1/2019 |

OTHER PUBLICATIONS

"Computer Network Graph," http://www.opte.org, accessed on the internet at http://www.opte.org, (Nov. 9, 2018), 1 page.
(Continued)

*Primary Examiner* — Brian F Shaw
(74) *Attorney, Agent, or Firm* — Goodwin Procter LLP

(57) ABSTRACT

A system for determining an entity's security rating may include a ratings engine and a security database. The security database may include a manifest and a distributed index containing security records. Each of the security records may have a key (e.g., a network identifier of a network asset) and a value (e.g., security information associated with the network asset identified by the key). The keyspace may be partitioned into multiple key ranges. The manifest may contain references to segments of the distributed index. Each segment may be associated with a key range and may index a group of security records having keys within the key range. The manifest and the segments may be stored in an object storage system. The ratings engine may determine the security rating of an entity based on security records of the entity's network assets, which may be retrieved from the database.

10 Claims, 7 Drawing Sheets

Related U.S. Application Data continuation of application No. 17/132,512, filed on Dec. 23, 2020, now Pat. No. 11,595,427, which is a division of application No. 16/779,437, filed on Jan. 31, 2020, now Pat. No. 10,893,067.

(51) Int. Cl.
*G06F 16/2453* (2019.01)
*G06F 16/2455* (2019.01)

(56) References Cited

U.S. PATENT DOCUMENTS

| | | |
|---|---|---|
| 6,578,066 B1 | 6/2003 | Logan et al. |
| 6,745,150 B1 | 6/2004 | Breiman |
| 6,785,732 B1 | 8/2004 | Bates et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,124,055 B2 | 10/2006 | Breiman |
| 7,194,769 B2 | 3/2007 | Lippmann et al. |
| 7,257,630 B2 | 8/2007 | Cole et al. |
| 7,290,275 B2 | 10/2007 | Baudoin et al. |
| 7,343,626 B1 | 3/2008 | Gallagher |
| 7,389,262 B1 | 6/2008 | Lange |
| 7,409,357 B2 | 8/2008 | Schaf et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| 8,042,184 B1 | 10/2011 | Batenin |
| 8,056,132 B1 | 11/2011 | Chang et al. |
| D652,048 S | 1/2012 | Joseph |
| 8,150,538 B2 | 4/2012 | Dubinsky |
| 8,239,939 B2 | 8/2012 | Dunagan et al. |
| D667,022 S | 9/2012 | LoBosco et al. |
| 8,266,695 B1 | 9/2012 | Clay, IV |
| 8,321,791 B2 | 11/2012 | Dixon et al. |
| 8,359,651 B1 | 1/2013 | Wu et al. |
| 8,370,933 B1 | 2/2013 | Buckler |
| 8,370,938 B1 | 2/2013 | Daswani et al. |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,578,496 B1 | 11/2013 | Krishnappa |
| 8,578,499 B1 | 11/2013 | Zhu et al. |
| 8,584,233 B1 | 11/2013 | Yang et al. |
| D696,677 S | 12/2013 | Corcoran et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,683,584 B1 | 3/2014 | Daswani et al. |
| 8,752,183 B1 | 6/2014 | Heiderich et al. |
| 8,775,402 B2 | 7/2014 | Baskerville et al. |
| 8,776,240 B1 | 7/2014 | Wu et al. |
| 8,806,646 B1 | 8/2014 | Daswani et al. |
| 8,825,662 B1 | 9/2014 | Kingman et al. |
| 8,839,432 B1 | 9/2014 | Patil |
| 8,850,570 B1 | 9/2014 | Ramzan |
| 8,898,776 B2 | 11/2014 | Molnar et al. |
| D719,969 S | 12/2014 | Ebtekar et al. |
| 8,949,988 B2 | 2/2015 | Adams et al. |
| 8,949,990 B1 | 2/2015 | Hsieh et al. |
| 8,966,639 B1 | 2/2015 | Roytman et al. |
| D727,942 S | 4/2015 | Angelides |
| 9,015,263 B2 | 4/2015 | Styler et al. |
| D730,918 S | 6/2015 | Park et al. |
| 9,049,222 B1 | 6/2015 | He et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| 9,323,930 B1 | 4/2016 | Satish |
| D756,371 S | 5/2016 | Bertnick et al. |
| D756,372 S | 5/2016 | Bertnick et al. |
| D756,392 S | 5/2016 | Yun et al. |
| D757,070 S | 5/2016 | Dziuba |
| D759,073 S | 6/2016 | Winklevoss |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,413,774 B1 | 8/2016 | Liu et al. |
| 9,420,049 B1 | 8/2016 | Talmor et al. |
| 9,424,333 B1 | 8/2016 | Bisignani et al. |
| 9,432,383 B2 | 8/2016 | Johns et al. |
| D766,952 S | 9/2016 | Gedrich et al. |
| 9,438,615 B2 | 9/2016 | Gladstone et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D774,068 S | 12/2016 | Derby et al. |
| 9,530,016 B1 | 12/2016 | Pomerantz |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,548,988 B1 | 1/2017 | Roundy et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| 9,578,048 B1 | 2/2017 | Hunt et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,166 S | 7/2017 | Sandhu et al. |
| D791,834 S | 7/2017 | Eze et al. |
| D792,427 S | 7/2017 | Weaver et al. |
| D794,666 S | 8/2017 | Havaldar et al. |
| D794,667 S | 8/2017 | Havaldar et al. |
| D795,891 S | 8/2017 | Kohan et al. |
| 9,736,019 B2 | 8/2017 | Hardison et al. |
| 9,742,796 B1 | 8/2017 | Salsamendi |
| 9,749,336 B1 | 8/2017 | Zhang et al. |

(56) References Cited

U.S. PATENT DOCUMENTS

| | | |
|---|---|---|
| D796,523 S | 9/2017 | Bhandari et al. |
| D797,138 S | 9/2017 | Reiter et al. |
| D801,989 S | 11/2017 | Iketsuki et al. |
| D803,237 S | 11/2017 | Wu et al. |
| 9,813,440 B1 | 11/2017 | Hoover et al. |
| 9,825,976 B1 | 11/2017 | Gomez et al. |
| 9,825,984 B1 | 11/2017 | Hoover et al. |
| D804,528 S | 12/2017 | Martin et al. |
| D806,735 S | 1/2018 | Olsen et al. |
| D806,737 S | 1/2018 | Chung et al. |
| D807,379 S | 1/2018 | Pahwa et al. |
| 9,880,710 B1 | 1/2018 | Mackinlay et al. |
| D809,523 S | 2/2018 | Lipka et al. |
| D809,989 S | 2/2018 | Lee et al. |
| D810,100 S | 2/2018 | Govindan Sankar Selvan et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| 9,973,524 B2 | 5/2018 | Boyer et al. |
| D819,687 S | 6/2018 | Yampolskiy et al. |
| D824,954 S | 8/2018 | Parfentieva et al. |
| 10,044,750 B2 | 8/2018 | Livshits et al. |
| D829,239 S | 9/2018 | Rehman |
| 10,079,854 B1 | 9/2018 | Scott et al. |
| 10,084,817 B2 | 9/2018 | Saher et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,242,180 B2 | 3/2019 | Haefner et al. |
| D847,147 S | 4/2019 | Wesley et al. |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| D853,413 S | 7/2019 | Hofner et al. |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| D864,219 S | 10/2019 | Farnan et al. |
| 10,453,142 B2 | 10/2019 | Mun |
| 10,469,515 B2 | 11/2019 | Helmsen et al. |
| 10,482,239 B1 | 11/2019 | Liu et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| 10,558,546 B2 | 2/2020 | Cranfill et al. |
| 10,572,945 B1 | 2/2020 | McNair |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| D900,145 S | 10/2020 | Malahy et al. |
| 10,796,260 B2 | 10/2020 | Brannon et al. |
| 10,805,331 B2 | 10/2020 | Boyer et al. |
| D903,693 S | 12/2020 | Li et al. |
| D905,712 S | 12/2020 | Li et al. |
| D905,730 S | 12/2020 | Newsom |
| D908,139 S | 1/2021 | Hardy et al. |
| 10,896,394 B2 | 1/2021 | Brannon et al. |
| D910,705 S | 2/2021 | Capela et al. |
| 10,909,488 B2 | 2/2021 | Hecht et al. |
| D914,719 S | 3/2021 | Ryan et al. |
| D914,732 S | 3/2021 | Fischbach |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,901 S | 7/2021 | Garg et al. |
| D924,909 S | 7/2021 | Nasu et al. |
| D931,867 S | 9/2021 | Okumura et al. |
| 11,122,073 B1 | 9/2021 | Cai et al. |
| 11,126,723 B2 | 9/2021 | Bagulho Monteiro Pereira |
| D940,742 S | 1/2022 | Vickers et al. |
| D946,596 S | 3/2022 | Ahmed |
| D947,238 S | 3/2022 | Nie et al. |
| D949,884 S | 4/2022 | Capela et al. |
| 11,334,832 B2 | 5/2022 | Dumoulin et al. |
| 11,379,773 B2 | 7/2022 | Vescio |
| D960,191 S | 8/2022 | Feit et al. |
| D960,924 S | 8/2022 | Nordstrom et al. |
| 11,455,322 B2 | 9/2022 | Yang et al. |
| D971,933 S | 12/2022 | Ahmed |
| D982,604 S | 4/2023 | Pacione et al. |
| D983,820 S | 4/2023 | Dunnette et al. |
| D987,668 S | 5/2023 | Mairs et al. |
| 11,652,834 B2 | 5/2023 | Gladstone et al. |
| D991,943 S | 7/2023 | Fawcett et al. |
| 11,727,114 B2 | 8/2023 | Bagulho Monteiro Pereira |
| 11,777,976 B2 | 10/2023 | Boyer et al. |
| D1,008,289 S | 12/2023 | Yazdansepas |
| D1,010,666 S | 1/2024 | Cai |
| D1,010,677 S | 1/2024 | Clymer |
| D1,014,517 S | 2/2024 | Russell |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0111358 A1 | 6/2004 | Lange et al. |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065754 A1 | 3/2005 | Schaf et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0228899 A1 | 10/2005 | Wendkos et al. |
| 2005/0234767 A1 | 10/2005 | Bolzman et al. |
| 2005/0278726 A1 | 12/2005 | Cano et al. |
| 2005/0278786 A1 | 12/2005 | Tippett et al. |

(56) References Cited

U.S. PATENT DOCUMENTS

| | | |
|---|---|---|
| 2006/0036335 A1 | 2/2006 | Banter et al. |
| 2006/0075490 A1 | 4/2006 | Boney et al. |
| 2006/0075494 A1 | 4/2006 | Bertman et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0230039 A1 | 10/2006 | Shull et al. |
| 2006/0253458 A1 | 11/2006 | Dixon et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0174915 A1 | 7/2007 | Gribble et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0097980 A1 | 4/2008 | Sullivan |
| 2008/0127338 A1 | 5/2008 | Cho et al. |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0222736 A1 | 9/2008 | Boodaei et al. |
| 2008/0262895 A1 | 10/2008 | Hofmeister et al. |
| 2008/0270458 A1 | 10/2008 | Gvelesiani |
| 2009/0019525 A1 | 1/2009 | Yu et al. |
| 2009/0024663 A1 | 1/2009 | McGovern |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0094697 A1 | 4/2009 | Provos et al. |
| 2009/0125427 A1 | 5/2009 | Atwood et al. |
| 2009/0132861 A1 | 5/2009 | Costa et al. |
| 2009/0147026 A1 | 6/2009 | Buck et al. |
| 2009/0150999 A1 | 6/2009 | Dewey et al. |
| 2009/0161629 A1 | 6/2009 | Purkayastha et al. |
| 2009/0193054 A1 | 7/2009 | Karimisetty et al. |
| 2009/0204235 A1 | 8/2009 | Dubinsky |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0114757 A1 | 5/2010 | Jeng et al. |
| 2010/0180344 A1 | 7/2010 | Malyshev et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0235910 A1 | 9/2010 | Ku et al. |
| 2010/0251000 A1 | 9/2010 | Lyne et al. |
| 2010/0251371 A1 | 9/2010 | Brown |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0060950 A1 | 3/2011 | Waldron et al. |
| 2011/0099620 A1 | 4/2011 | Stavrou et al. |
| 2011/0106920 A1 | 5/2011 | Longo |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0185427 A1 | 7/2011 | Aciicmez et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239294 A1 | 9/2011 | Kim et al. |
| 2011/0239300 A1 | 9/2011 | Klein et al. |
| 2011/0249002 A1 | 10/2011 | Duplessis et al. |
| 2011/0276514 A1 | 11/2011 | Kalagnanam et al. |
| 2011/0282997 A1 | 11/2011 | Prince et al. |
| 2011/0289582 A1 | 11/2011 | Kejriwal et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0079596 A1 | 3/2012 | Thomas et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0254993 A1 | 10/2012 | Sallam |
| 2012/0255021 A1 | 10/2012 | Sallam |
| 2012/0255027 A1 | 10/2012 | Kanakapura et al. |
| 2012/0290498 A1 | 11/2012 | Jones |
| 2012/0291129 A1 | 11/2012 | Shulman et al. |
| 2013/0014253 A1 | 1/2013 | Neou et al. |
| 2013/0055070 A1 | 2/2013 | Sacks et al. |
| 2013/0055386 A1 | 2/2013 | Kim et al. |
| 2013/0060351 A1 | 3/2013 | Imming et al. |
| 2013/0080341 A1 | 3/2013 | Veeramachaneni et al. |
| 2013/0080505 A1 | 3/2013 | Nielsen et al. |
| 2013/0086521 A1 | 4/2013 | Grossele et al. |
| 2013/0086681 A1 | 4/2013 | Jaroch |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0145437 A1 | 6/2013 | Zaitsev |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0238527 A1 | 9/2013 | Jones |
| 2013/0263034 A1 | 10/2013 | Bruck et al. |
| 2013/0263270 A1 | 10/2013 | Cote et al. |
| 2013/0275176 A1 | 10/2013 | Brown et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0318594 A1 | 11/2013 | Hoy et al. |
| 2013/0333038 A1 | 12/2013 | Chien |
| 2013/0345978 A1 | 12/2013 | Lush et al. |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0040747 A1 | 2/2014 | Gardenfors |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |

(56) References Cited

U.S. PATENT DOCUMENTS

| | | |
|---|---|---|
| 2014/0114843 A1 | 4/2014 | Klein et al. |
| 2014/0130158 A1 | 5/2014 | Wang et al. |
| 2014/0137254 A1 | 5/2014 | Ou et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0189864 A1 | 7/2014 | Wang et al. |
| 2014/0204803 A1 | 7/2014 | Nguyen et al. |
| 2014/0206970 A1 | 7/2014 | Wesley et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283067 A1 | 9/2014 | Call et al. |
| 2014/0283068 A1 | 9/2014 | Call et al. |
| 2014/0283069 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0088783 A1 | 3/2015 | Mun |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0213259 A1 | 7/2015 | Du et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0339479 A1 | 11/2015 | Wang et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0365587 A1 | 12/2015 | Ha et al. |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0028746 A1 | 1/2016 | Tonn |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0104071 A1 | 4/2016 | Brueckner |
| 2016/0119373 A1 | 4/2016 | Fausto et al. |
| 2016/0140466 A1 | 5/2016 | Sidebottom et al. |
| 2016/0142419 A1 | 5/2016 | Antipa et al. |
| 2016/0142428 A1 | 5/2016 | Pastore et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0239772 A1 | 8/2016 | Dahlberg |
| 2016/0241560 A1 | 8/2016 | Reshadi et al. |
| 2016/0248797 A1 | 8/2016 | Yampolskiy et al. |
| 2016/0248800 A1 | 8/2016 | Ng et al. |
| 2016/0253500 A1 | 9/2016 | Alme et al. |
| 2016/0259945 A1 | 9/2016 | Yampolskiy et al. |
| 2016/0291860 A1 | 10/2016 | Higuchi et al. |
| 2016/0335232 A1 | 11/2016 | Born et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0359875 A1 | 12/2016 | Kim et al. |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0063923 A1 | 3/2017 | Yang et al. |
| 2017/0104783 A1 | 4/2017 | Vanunu et al. |
| 2017/0126719 A1 | 5/2017 | Mason |
| 2017/0142148 A1 | 5/2017 | Bußer et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0277892 A1 | 9/2017 | MacDermid |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0041521 A1 | 2/2018 | Zhang et al. |
| 2018/0052999 A1 | 2/2018 | Mitola, III |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0218157 A1 | 8/2018 | Price et al. |
| 2018/0285414 A1 | 10/2018 | Kondiles et al. |
| 2018/0322584 A1 | 11/2018 | Crabtree et al. |
| 2018/0324201 A1 | 11/2018 | Lowry et al. |
| 2018/0332076 A1 | 11/2018 | Callahan et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2018/0375953 A1 | 12/2018 | Casassa Mont et al. |
| 2019/0034845 A1 | 1/2019 | Mo et al. |
| 2019/0052650 A1 | 2/2019 | Hu et al. |
| 2019/0065545 A1 | 2/2019 | Hazel et al. |
| 2019/0065748 A1 | 2/2019 | Foster et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0163914 A1 | 5/2019 | Steele et al. |
| 2019/0166152 A1 | 5/2019 | Steele et al. |
| 2019/0166156 A1 | 5/2019 | King-Wilson |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1 | 9/2019 | Geil et al. |

(56) References Cited

U.S. PATENT DOCUMENTS

| | | | |
|---|---|---|---|
| 2019/0303574 | A1 | 10/2019 | Lamay et al. |
| 2019/0303584 | A1 | 10/2019 | Yang et al. |
| 2019/0362280 | A1 | 11/2019 | Vescio |
| 2019/0379632 | A1 | 12/2019 | Dahlberg et al. |
| 2019/0391707 | A1 | 12/2019 | Ristow et al. |
| 2019/0392252 | A1 | 12/2019 | Fighel et al. |
| 2020/0012794 | A1 | 1/2020 | Saldanha et al. |
| 2020/0053127 | A1 | 2/2020 | Brotherton et al. |
| 2020/0065213 | A1 | 2/2020 | Poghosyan et al. |
| 2020/0074084 | A1 | 3/2020 | Dorrans et al. |
| 2020/0092172 | A1 | 3/2020 | Kumaran et al. |
| 2020/0097845 | A1 | 3/2020 | Shaikh et al. |
| 2020/0104488 | A1 | 4/2020 | Li et al. |
| 2020/0106798 | A1 | 4/2020 | Lin |
| 2020/0120118 | A1 | 4/2020 | Shu et al. |
| 2020/0125734 | A1 | 4/2020 | Light et al. |
| 2020/0134175 | A1 | 4/2020 | Marwah et al. |
| 2020/0183655 | A1 | 6/2020 | Barday et al. |
| 2020/0186546 | A1 | 6/2020 | Dichiu et al. |
| 2020/0272763 | A1 | 8/2020 | Brannon et al. |
| 2020/0285737 | A1 | 9/2020 | Kraus et al. |
| 2020/0356689 | A1 | 11/2020 | McEnroe et al. |
| 2020/0356695 | A1 | 11/2020 | Brannon et al. |
| 2021/0064746 | A1 | 3/2021 | Koide et al. |
| 2021/0073377 | A1 | 3/2021 | Coull et al. |
| 2021/0342785 | A1 | 11/2021 | Mann et al. |
| 2022/0191232 | A1 | 6/2022 | Cai et al. |
| 2023/0030077 | A1 | 2/2023 | Park et al. |

OTHER PUBLICATIONS

Search Query Report from IP.com (performed Jul. 29, 2022).
Chernyshev, M. et al., "On 802.11 Access Point Locatability and Named Entity Recognition in Service Set Identifiers", IEEE Trans. on Info. and Sec., vol. 11 No. 3 (Mar. 2016).
Winship, C., "Models for sample selection bias", Annual review of sociology, 18(1) (Aug. 1992), pp. 327-350.
Santos, J. R. et al., "A framework for linking cybersecurity metrics to the modeling of macroeconomic interdependencies." Risk Analysis: An International Journal (2007) 27.5, pp. 1283-1297.
Rees, L. P. et al., "Decision support for cybersecurity risk planning." Decision Support Systems 51.3 (2011): pp. 493-505.
McNab, "Network Security Assessment," copyright 2004, 13 pages.
Morningstar Direct, dated to Nov. 12, 2020, morningstardirect.com [online]. Retrieved Feb. 26, 2021 from internet URL:https://web.archive.org/web/20201112021943/https://www.morningstar.com/products/direct, (Year: 2020).
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber=1258471 (Year: 2003).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber 8869252 (Year: 2019).
Seigneur et al., A Survey of Trust and Risk Metrics for a BYOD Mobile Worker World: Third International Conference on Social Eco-Informatics, 2013, 11 pages.
"An Executive View of IT Governance," IT Governance Institute, 2009, 32 pages.
Camelo, "Botnet Cluster Identification," Sep. 2014, 90 pages.
Camelo, "Condenser: A Graph-based Approach for Detecting Botnets," AnubisNetworks R&D, Amadora, Portugal and CENTRIA, Universidade NOVA de Lisboa, Portugal, 8 pages, (Oct. 31, 2014).
Search Query Report form IP.com (performed Apr. 27, 2020).
Seneviratne et al., "SSIDs in the Wild: Extracting Semantic Information from WiFi SSIDs" HAL archives-ouvertes.fr, HAL Id: hal-01181254, Jul. 29, 15, 5 pages.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
McNab, "Network Security Assessment," copyright 2004, 56 pages.
"Tenable Nessus Network Vulnerability Scanner," accessed on the internet at https://www.tenable.com/products/nessus/nessus-professional, (Nov. 9, 2018), 13 pages.
"Rapid7 Nexpose Vulnerability Scanner," accessed on the internet at https://web.archive.org/web/20170520082737/https://www.rapid7.com/products/nexpose/; May 20, 2017.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
"Palantir Cyber: Uncovering malicious behavior at petabyte scale," accessed on the internet at https://www.youtube.com/watch?v=EhYezV06EE; Dec. 21, 2012; 1 page.
Mile 2 CPTE Maltego Demo, accessed on the internet at https://www.youtube.com/watch?v=020NKOUzPOU; Jul. 12, 2012; 1 page.
Gephi (gephi.org), accessed on the internet at https://web.archive.org/web/20151216223216/https://gephi.org/; Dec. 16, 2015; 1 page.
"Plugging the Right Holes," Lab Notes, MIT Lincoln Library, Posted Jul. 2008, retrieved Sep. 14, 2010 from http://www.II.miLedufpublicationsflabnotesfpluggingtherightho!. . . , 2 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
Chuvakin, "SIEM: Moving beyond compliance", RSA White Paper (2010) (16 pages).
Jin et al., "Identifying and tracking suspicious activities through IP gray space analysis", MineNet, Jun. 12, 2007 (6 pages).
Bhilare et al., "Protecting Intellectual Property and Sensitive Information in Academic Campuses from Trusted Insiders: Leveraging Active Directory", SIGUCC, Oct. 2009 (5 pages).
Li et al., "Finding the Linchpins of the Dark Web: a Study on Topologically Dedicated Hosts on Malicious Web Infrastructures", IEEE, 2013 (15 pages).
Provos et al., "The Ghost in the Browser Analysis of Web-based Malware", 2007 (9 pages).
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages, (Jun. 6, 2011).
U.S. Appl. No. 13/240,572.
U.S. Appl. No. 14/021,585.
U.S. Appl. No. 14/944,484.
U.S. Appl. No. 61/386,156.
BitSight, "Cyber Security Myths Versus Reality: How Optimism Bias Contributes to Inaccurate Perceptions of Risk", Jun. 2015, Dimensional Research, pp. 1-9.
"Amazon Mechanical Turk," accessed on the internet at https://www.mturk.com/, (Nov. 9, 2018), 7 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
Moradi, et al., "Quantitative Models for Supply Chain Management," IGI Global, 2012, 29 pages.
Noel, et al., "Big-Data Architecture for Cyber Attack Graphs, Representing Security Relationships in NoSQL Graph Databases," The MITRE Corporation, 2014, 6 pages.

(56) References Cited

OTHER PUBLICATIONS

Maltego XL, accessed on the Internet at https://www.paterva.com/web7/buy/maltego-clients/maltego-xl.php, 5 pages, (Nov. 7, 2018).
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
"Palantir.com," accessed on the internet at http://www.palantir.com/; Dec. 2015; 2 pages.
Jean, "Cyber Security: How to use graphs to do an attack analysis," accessed on the internet at https://linkurio.us/blog/cyber-security-use-graphs-attack-analysis/; Aug. 2014, 11 pages.
Carstens, et al., "Modeling Company Risk and Importance in Supply Graphs," European Semantic Web Conference 2017: The Semantic Web, pp. 18-31, (May 7, 2017).
"Creating Transparency with Palantir," accessed on the internet at https://www.youtube.com/watch?v=8cbGChfagUA; Jul. 5, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
Borgatti, et al., "On Social Network Analysis in a Supply Chain Context," Journal of Supply Chain Management; 45(2): 5-22; Apr. 2009, 18 pages.
Wagner, et al., "Assessing the vulnerability of supply chains using graph theory," Int. J. Production Economics 126 (2010) 121-129.
Security Warrior, Cyrus Peikari, Anton, Chapter 8: Reconnaissance, 6 pages, (Jan. 2004).
Williams, Leevar, et al., "An Interactive Attack Graph Cascade and Reachability Display," MIT Lincoln Laboratory, 17 pages, (Jan. 2007).
Williams, Leevar, et al., "GARNET: A Graphical Attack Graph and Reachability Network Evaluation Tool," MIT Lincoln Library, VizSEC 2009, pp. 44-59, (Sep. 15, 2008).
2009 Data Breach Investigations Report, study conducted by Verizon Business RISK Team, 52 pages.
Taleb, Nassim N., et al., "The Six Mistakes Executives Make in Risk Management," Harvard Business Review, Oct. 2009, 5 pages.
"Report on Controls Placed in Operation and Test of Operating Effectiveness," EasCorp, Jan. 1 through Dec. 31, 2008, prepared by Crowe Horwath, 58 pages.
Paxson, Vern, "How The Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Lippmann, Rich, et al., NetSPA: a Network Security Planning Architecture, MIT Lincoln Laboratory, 11 pages.
Rare Events, Oct. 2009, JASON, The MITRE Corporation, Oct. 2009, 104 pages.
Lippmann, Richard, et al., "Validating and Restoring Defense in Depth Using Attack Graphs," MIT Lincoln Laboratory, 10 pages, (Oct. 23, 2006).
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Johnson, Eric, et al., "Information Risk and the Evolution of the Security Rating Industry," Mar. 24, 2009, 27 pages.
Ingols, Kyle, et al., "Practical Experiences Using SCAP to Aggregate CND Data," MIT Lincoln Library, Presentation to NIST SCAP Conference, Sep. 24, 2008, 59 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Modeling Modern Network Attacks and Countermeasures Using Attack Graphs," MIT Lincoln Laboratory, 16 pages, (Dec. 7, 2009).
Stone-Gross, Brett, et al., "FIRE: Finding Rogue Networks," 10 pages, (Dec. 7, 2009).
Report to the Congress on Credit Scoring and Its Effects on the Availability and Affordability of Credit, Board of Governors of the Federal Reserve System, Aug. 2007, 304 pages.
The Fair Credit Reporting Act (FCRA) of the Federal Trade Commission (FTC), Jul. 30, 2004, 86 pages.
Equifax Inc. Stock Report, Standard & Poor's, Jun. 6, 2009, 8 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Dillon-Merrill, PhD., Robin L, et al., "Logic Trees: Fault, Success, Attack, Event, Probability, and Decision Trees," Wiley Handbook of Science and Technology for Homeland Security, 13 pages, (Mar. 15, 2009).
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
"Assuring a Trusted and Resilient Information and Communications Infrastructure," Cyberspace Policy Review, May 2009, 76 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Method Documentation, CNSS Risk Assessment Tool Version 1.1, Mar. 31, 2009, 24 pages.
The CIS Security Metrics v1.0.0, The Center for Internet Security, May 11, 2009, 90 pages.
Chu, Matthew, et al., "Visualizing Attack Graphs, Reachability, and Trust Relationships with NAVIGATOR," MIT Lincoln Library, VizSEC '10, Ontario, Canada, Sep. 14, 2010, 12 pages.
Buehler, Kevin S., et al., "Running with risk," The Mckinsey Quarterly, No. 4, 2003, pp. 40-49.
Buckshaw, Donald L., "Use of Decision Support Techniques for Information System Risk Management," submitted for publication in Wiley's Encyclopedia of Quantitative Risk Assessment in Jan. 2007, 11 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
"Shared Assessments: Getting Started," BITS, 2008, 4 pages.
Browne, Niall, et al., "Shared Assessments Program AUP and SAS70 Frequently Asked Questions," BITS, 4 pages.
The Financial Institution Shared Assessments Program, Industry Positioning and Mapping Document, BITS, Oct. 2007, 44 pages.
"Master Security Criteria," Version 3.0, BITS Financial Services Security Laboratory, Oct. 2001, 47 pages.
"Agreed Upon Procedures," Version 4.0, BITS, The Financial Institution Shared Assessments Program, Assessment Guide, Sep. 2008, 56 pages.
Nye, John, "Avoiding Audit Overlap," Moody's Risk Services, Presentation, Source Boston, Mar. 14, 2008, 19 pages.
Artz, Michael Lyle, "NetSPA: A Network Security Planning Architecture," Massachusetts Institute of Technology, May 24, 2002, 97 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
SBIR Phase I: Enterprise Cyber Security Scoring, CyberAnalytix, LLC, http://www.nsf.gov/awardsearch/showAward.do?AwardNumber=l013603, Apr. 28, 2010, 2 pages.
Edmonds, Robert, "ISC Passive DNS Architecture", Internet Systems Consortium, Inc., Mar. 2012, 18 pages.
Hacking Exposed 6, S. McClure et al., copyright 2009, 37 pages.

(56) References Cited

OTHER PUBLICATIONS

Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
RFC 1834, https://tools.ietf.org/html/rfc1834, date accessed Sep. 28, 2016, 7 pages.
Snort Intrusion Monitoring System, http://archive.oreilly.com/pub/h/1393, date accessed Sep. 28, 2016, 3 pages.
Wikipedia, https://en.wikipedia.org/wiki/Crowdsourcing, date accessed Sep. 28, 2016, 25 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
SamSpade Network Inquiry Utility, https://www.sans.org/reading-room/whitepapers/tools/sam-spade-934, date accessed Sep. 28, 2016, 19 pages.
Maxmind, https://www.maxmind.com/en/about-maxmind, https://www.maxmind.com/en/geoip2-isp-database, date accessed Sep. 28, 2016, 3 pages.
RFC 950, https://tools.ietf.org/html/rfc950, date accessed Sep. 28, 2016, 19 pages.
RFC 781, https://tools.ietf.org/html/rfc781, date accessed Sep. 28, 2016, 3 pages.
RFC 954, https://tools.ietf.org/html/rfc954, date accessed Sep. 28, 2016, 5 pages.
U.S. Appl. No. 15/271,655 Published as: US 2018/0083999, Self-Published Security Risk Management, filed Sep. 21, 2016.
U.S. Appl. No. 15/377,574 U.S. Pat. No. 9,705,932, Methods and Systems For Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 U.S. Pat. No. 10,326,786 Published as: US 2016/0330231, Methods For Using Organizational Behavior For Risk Ratings, filed Jul. 22, 2016.
U.S. Appl. No. 15/239,063 U.S. Pat. No. 10,341,370 Published as: US2017/0093901, Security Risk Management, filed Aug. 17, 2016.
U.S. Appl. No. 16/405,121 U.S. Pat. No. 10,785,245 Published as: US2019/0260791, Methods for Using Organizational Behavior For Risk Ratings, filed May 7, 2019.
U.S. Appl. No. 17/025,930 U.S. Pat. No. 11,652,834 Published as: US2021/0006581, Methods for Using Organizational Behavior For Risk Ratings, filed Sep. 18, 2020.
U.S. Appl. No. 18/297,863 Published as: US2023/0247041, Methods for Using Organizational Behavior For Risk Ratings, filed Apr. 10, 2023.
U.S. Appl. No. 13/240,572 U.S. Pat. No. 10,805,331, Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 17/069,151 U.S. Pat. No. 11,777,976 Published as: US2016/0323308, Information Technology Security Assessment System, filed Oct. 13, 2020.
U.S. Appl. No. 18/453,488 Published as: US2023/0403295, Information Technology Security Assessment System, filed Aug. 22, 2023.
U.S. Appl. No. 18/461,087 Published as: US2023/0421600, Information Technology Security Assessment System, filed Sep. 5, 2023.
U.S. Appl. No. 15/142,677 U.S. Pat. No. 9,830,569 Published as: US2016/0239772, Security Assessment Using Service Provider Digital Asset Information, filed Apr. 29, 2016.
U.S. Appl. No. 18/637,577, Information Technology Security Assessment System, filed Apr. 17, 2024.
U.S. Appl. No. 15/134,845 U.S. Pat. No. 9,680,858, Annotation Platform For a Security Risk System, filed Apr. 21, 2016.
U.S. Appl. No. 15/044,952 U.S. Pat. No. 11,182,720 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 D. 835,631, Computer Display Screen With Graphical User Interface, filed Mar. 24, 2017.
U.S. Appl. No. 29/598,299 D. 818,475, Computer Display With Security Ratings Graphical User Interface, filed Mar. 24, 2017.
U.S. Appl. No. 29/599,622 D. 847,169, Computer Display With Security Ratings Graphical User Interface, filed Apr. 5, 2017.
U.S. Appl. No. 29/599,620 D. 846,562, Computer Display With Security Ratings Graphical User Interface, filed Apr. 5, 2017.
U.S. Appl. No. 16/015,686 U.S. Pat. No. 10,425,380 Published as: US2018/0375822, Methods for Mapping IP Addresses and Domains to Organizations Using User Activity Data, filed Jun. 22, 2018.
U.S. Appl. No. 16/543,075 U.S. Pat. No. 10,554,619 Published as: US Published as: US2019/0379632, Methods for Mapping IP Addresses and Domains to Organizations Using User Activity Data, filed Aug. 16, 2019.
U.S. Appl. No. 16/738,825 U.S. Pat. No. 10,893,021 Published as: US2020/0153787, Methods for Mapping IP Addresses and Domains to Organizations Using User Activity Data, filed Jan. 9, 2020.
U.S. Appl. No. 17/146,064 U.S. Pat. No. 11,627,109 Published as: US2021/0218702, Methods for Mapping IP Addresses and Domains to Organizations Using User Activity Data, filed Jan. 11, 2021.
U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723 Published as: US2019/0297106, Correlated Risk in Cybersecurity, filed Mar. 5, 2019.
U.S. Appl. No. 16/795,056 U.S. Pat. No. 10,931,705 Published as: US2020/0195681, Correlated Risk in Cybersecurity, filed Feb. 19, 2020.
U.S. Appl. No. 17/179,630 U.S. Pat. No. 11,770,401 Published as: US2021/0176269, Correlated Risk in Cybersecurity, filed Feb. 19, 2021.
U.S. Appl. No. 18/365,384 Published as: US2023/0396644, Correlated Risk in Cybersecurity, filed Aug. 4, 2023.
U.S. Appl. No. 16/170,680 U.S. Pat. No. 10,521,583, System and Methods For Remote Detection of Software Through Browser Webinjects, filed Oct. 25, 2018.
U.S. Appl. No. 16/688,647 U.S. Pat. No. 10,776,483 Published as: US2020/0134174, System and Methods For Remote Detection of Software Through Browser Webinjects, filed Nov. 19, 2019.
U.S. Appl. No. 17/000,135 U.S. Pat. No. 11,126,723 Published as: US2021/0004457, System and Methods For Remote Detection of Software Through Browser Webinjects, filed Aug. 21, 2020.
U.S. Appl. No. 17/401,683 U.S. Pat. No. 11,727,114 Published as: US2021/0374243, System and Methods For Remote Detection of Software Through Browser Webinjects, filed Aug. 13, 2021.
U.S. Appl. No. 18/333,768 Published as: US2023/0325502, System and Methods For Remote Detection of Software Through Browser Webinjects, filed Jun. 13, 2023.
U.S. Appl. No. 15/954,921 U.S. Pat. No. 10,812,520 Published as: US2019/0319979, Systems and Methods For External Detection of Misconfigured Systems, filed Apr. 17, 2018.
U.S. Appl. No. 17/014,495 U.S. Pat. No. 11,671,441 Published as: US2020/0404017, Systems and Methods For External Detection of Misconfigured Systems, filed Sep. 8, 2020.
U.S. Appl. No. 18/302,925 Published as: US2023/0269267, Systems and Methods For External Detection of Misconfigured Systems, filed Apr. 19, 2023.
U.S. Appl. No. 16/549,764 Published as: US2021/0058421, Systems and Methods For Inferring Entity Relationships Via Network Communications of Users or User Devices, filed Aug. 23, 2019.
U.S. Appl. No. 16/787,650 U.S. Pat. No. 10,749,893, Systems and Methods For Inferring Entity Relationships Via Network Communications of Users or User Devices, filed Feb. 11, 2020.
U.S. Appl. No. 18/429,539, Systems and Methods For Inferring Entity Relationships Via Network Communications of Users or User Devices, filed Feb. 1, 2024.

(56) References Cited

OTHER PUBLICATIONS

U.S. Appl. No. 16/583,991 U.S. Pat. No. 10,848,382, Systems and Methods For Network Asset Discovery and Association Thereof With Entities, filed Sep. 26, 2019.
U.S. Appl. No. 17/085,550 U.S. Pat. No. 11,329,878 Published as: US2021/0099347, Systems and Methods For Network Asset Discovery and Association Thereof With Entities, filed Oct. 30, 2020.
U.S. Appl. No. 29/666,942 D. 892,135, Computer Display Wtih Graphical User Interface, filed Oct. 17, 2018.
U.S. Appl. No. 16/360,641 U.S. Pat. No. 11,200,323, Published as: US2020/0125734, Systems and Methods For Forecasting Cybersecurity Ratings Based on Event-Rate Scenarios, filed Mar. 21, 2019.
U.S. Appl. No. 17/523,166 U.S. Pat. No. 11,783,052 Published as: US2022/0121753, Systems and Methods For Forecasting Cybersecurity Ratings Based on Event-Rate Scenarios, filed Nov. 10, 2021.
U.S. Appl. No. 16/514,771 U.S. Pat. No. 10,726,136, Systems and Methods For Generating Security Improvement Plans For Entities, filed Jul. 17, 2019.
U.S. Appl. No. 16/922,673 U.S. Pat. No. 11,030,325 Published as: US2021/0019424, Systems and Methods For Generating Security Improvement Plans For Entities, filed Jul. 7, 2020.
U.S. Appl. No. 17/307,577 U.S. Pat. No. 11,675,912 Published as: US2021/0211454, Systems and Methods For Generating Security Improvement Plans For Entities, filed May 4, 2021.
U.S. Appl. No. 18/138,803 Published as US2023/0267215, Systems and Methods For Generating Security Improvement Plans For Entities, filed Apr. 25, 2023.
U.S. Appl. No. 29/677,306 D. 905,702, Computer Display Screen With Corporate Hierarchy Graphical User Interface, filed Jan. 18, 2019.
U.S. Appl. No. 16/775,840 U.S. Pat. No. 10,791,140, Systems and Methods For Assessing Cybersecurity State of Entities Based on Computer Network Characterization, filed Jan. 29, 2020.
U.S. Appl. No. 17/018,587 U.S. Pat. No. 11,050,779, Systems and Methods For Assessing Cybersecurity State of Entities Based on Computer Network Characterization, filed Sep. 11, 2020.
U.S. Appl. No. 16/779,437 U.S. Pat. No. 10,893,067 Published as: US2021/0243221, Systems and Methods For Rapidly Generating Security Ratings, filed Jan. 31, 2020.
U.S. Appl. No. 17/132,512 U.S. Pat. No. 11,595,427 Published as: US2021/0243221, Systems and Methods For Rapidly Generating Security Ratings, filed Dec. 23, 2020.
U.S. Appl. No. 18/158,594 U.S. Pat. No. 11,777,983, Systems and Methods For Rapidly Generating Security Ratings, filed Jan. 24, 2023.
U.S. Appl. No. 17/119,822 U.S. Pat. No. 11,122,073, Systems and Methods For Cybersecurity Risk Mitigation and Management, filed Dec. 11, 2020.
U.S. Appl. No. 29/815,855 D. 101,0666, Computer Display With a Graphical User Interface For Cybersecurity Risk Management, filed Nov. 17, 2021.
U.S. Appl. No. 17/392,521 U.S. Pat. No. 11,689,555 Published as US 2022/0191232, Systems and Methods For Cybersecurity Risk Mitigation and Management, filed Aug. 3, 2021.
U.S. Appl. No. 18/141,654 Published as: US2023/0269265, Systems and Methods For Cybersecurity Risk Mitigation and Management, filed May 1, 2023.
U.S. Appl. No. 29/916,503, Computer Display With a Graphical User Interface, filed Nov. 13, 2023.
U.S. Appl. No. 29/916,519, Computer Display With a Graphical User Interface, filed Nov. 13, 2023.
U.S. Appl. No. 16/802,232 U.S. Pat. No. 10,764,298, System and Methods For Improving a Security Profile of an Entity Based on Peer Security Profiles, filed Feb. 26, 2020.
U.S. Appl. No. 16/942,452 U.S. Pat. No. 11,265,330 Published as: US2021/0266324, System and Methods For Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641 D. 937,870, Computer Display With Peer Analytics Graphical User Interface, filed Jun. 2, 2020.
U.S. Appl. No. 17/039,675 U.S. Pat. No. 11,032,244 Published as: US2021/0099428, Systems and Methods For Determining Asset Importance in Security Risk Management, filed Sep. 30, 2020.
U.S. Appl. No. 17/320,997 Published as US 2021/0344647, Systems and Methods For Determining Asset Importance in Security Risk Management, filed May 14, 2021.
U.S. Appl. No. 18/422,470, Systems and Methods For Determining Asset Importance in Security Risk Management, filed Jan. 25, 2024.
U.S. Appl. No. 16/884,607 U.S. Pat. No. 11,023,585, Systems and Methods For Managing Cybersecurity Alerts, filed May 27, 2020.
U.S. Appl. No. 17/236,594 U.S. Pat. No. 11,720,679 Published as: US2021/0374246, Systems and Methods For Managing Cybersecurity Alerts, filed Apr. 21, 2021.
U.S. Appl. No. 18/335,384 Published as: US2023/0325505, Systems and Methods For Managing Cybersecurity Alerts, filed Jun. 15, 2023.
U.S. Appl. No. 17/710,168 Published as: US2022/0318400, Systems and Methods For Assessing Cybersecurity Risk in a Work From Home Environment, filed Mar. 31, 2022.
U.S. Appl. No. 18/770,949, Systems and Methods For Assessing Cybersecurity Risk in a Work From Home Environment, filed Jul. 12, 2024.
U.S. Appl. No. 17/945,337 Published as US2023/0091953, Systems and Methods For Precomputation of Digital Asset Inventories, filed Sep. 15, 2022.
U.S. Appl. No. 18/359,183 Published as: US2024/0045950, Systems and Methods For Assessing Cybersecurity Efficacy of Entities Against Common Control and Maturity Frameworks Using Externally-Observed Datasets, filed Jul. 26, 2023.
U.S. Appl. No. 17/856,217 Published as: US2023/0004655, Systems and Methods For Accelerating Cybersecurity Assessments, filed Jul. 1, 2022.
U.S. Appl. No. 18/162,154 Published as: US2023/0244794, Systems and Methods For Assessment of Cyber Resilience, filed Jan. 31, 2023.
U.S. Appl. No. 18/328,142, Systems and Methods For Modeling Cybersecurity Breach Costs, filed Jun. 2, 2023.
U.S. Appl. No. 18/678,378, Systems and Methods For Predicting Cybersecurity Risk Based on Entity Firmographics, filed May 30, 2024.
"Maltego 3 GUI user guide," 11 pages, Nov. 22, 2010 retrieved from Internet Archive Wayback Machine, https://web.archive.org/web/20101122112311/http://www.paterva.com:80/web5/documentation/Maltego3_crash_course.pdf on Aug. 30, 2024.
"User guide—Addendum to guide for Maltego 3.0.2," 20 pages, Nov. 23, 2010 retrieved from Internet Archive Wayback Machine, https://web.archive.org/web/20101123012539/http://www.paterva.com:80/web5/documentation/3.0.2.addendum.pdf on Aug. 30, 2024.
'834 Patent Claim Chart, *BitSight Technologies, Inc. v. NormShield Inc. d/b/a Black Kite Inc.*, Case No. 1:23-cv-12055-MJJ, D.I. 39-11 (Dec. 11, 2023), 28 pages.
"Maltego User Guide" webpage http://ctas.paterva.com/view/Userguide, 35 pages, Jun. 6, 2012, retrieved from Internet Archive Wayback Machine https://web.archive.org/web/20120606172056/http://ctas.paterva.com/view/Userguide on Sep. 6, 2024.
"MW Metadata", webpage https://mattw.io/youtube-metadata, 7 pages, retrieved on Aug. 21, 2024.
Anderson, H., "Nessus, Part 3: Analysing Reports," webpage http://www.securityfocus.com/infocus/1759, 5 pages, Oct. 20, 2006, retrieved from Internet Archive Wayback Machine https://web.archive.org/web/20061020202310/http://www.securityfocus.com/infocus/1759 on Aug. 16, 2024.
Aug. 29, 2024 Email from Melissa Nezhnik, 3 pages.
Gates, C., "New School Information Gathering," (2008), available at https://www.carnal0wnage.com/papers/17_Gates.pdf, 84 pages.
Gates, C., "Toorcon X Gates: New School Information Gathering," 2 pages, Mar. 2, 2009, retrieved from Internet Archive Wayback Machine https://web.archive.org/web/20090302045813/vimeo.com//2745624 on Aug. 13, 2024.

(56) References Cited

OTHER PUBLICATIONS

Gates, C., "Toorcon X Gates: New School Information Gathering," available at http://vimeo.com/2745624, 2 pages, retrieved on Aug. 13, 2024.

Khalil, J. et al., "Discovering Malicious Domains through Passive DNS Data Graph Analysis," Conference Paper, (Jun. 2016), 13 pages.

Knowles, D. et al., "W32.Blaster. Worm: Technical Details" webpage http://www.symantec.com/security_response/writeup.jsp?docid=2003-081113-0229-99&tabid=2, 3 pages, May 3, 2007, retrieved from Internet Archive Wayback Machine https://web.archive.org/web/20070503023514/http://www.symantec.com/security_response/writeup.jsp?docid=2003-081113-0229-99&tabid=2 on Aug. 16, 2024.

Levy, E., "The Making of a Spam Zombie Army," IEEE Computer & Security (2003), pp. 58-59.

Long, J., "Google Hacking for Penetration Testers," 170 pages, Jan. 31, 2006, retrieved from Internet Archive Wayback Machine, https://web.archive.org/web/20060131095431/http://www.blackhat.com/presentations/bh-europe-05/BH_EU_05-Long.pdf on Aug. 30, 2024.

Martorella, C., "A fresh new look into Information Gathering," 68 pages, Dec. 29, 2009 retrieved from Internet Archive Wayback Machine, https://web.archive.org/web/20091229020339/http://www.edgesecurity.com/docs/OWASP-Christian_Martorella-InformationGathering.pdf on Aug. 30, 2024.

Matta Security Limited, "An Introduction to Internet Attack & Penetration," available at http://www.trustmatta.com/downloads/pdf/, Matta_Attack_and_Penetration_Introduction.pdf, (2001-2002), 14 pages.

McNab, C., "Network Security Assessment," O'Reilly Media, Inc., Second Edition, (2008), 506 pages.

Moore & Valsmith, et al., "Tactical Exploitation," 37 pages, Feb. 8, 2010, retrieved from Internet Archive Wayback Machine https://web.archive.org/web/20100208161237/https://www.blackhat.com/presentations/bh-usa-07/Moore_and_Valsmith/Whitepaper/bh-USA-07-moore_and_valsmith-WP.pdf.

Nessus, "Documentation," webpage http://www.nessus.org/documentation/, 2 pages, Feb. 19, 2007, retrieved from Internet Archive Wayback Machine https://web.archive.org/web/20070219213924/http://www.nessus.org/documentation/ on Aug. 16, 2024.

Nessus, "Plugins: Symantec Anti Virus Corporate Edition Check," webpage http://www.nessus.org/plugins/index.php?view=single&id=21725, 2 pages, Feb. 22, 2007, retrieved from Internet Archive Wayback Machine https://web.archive.org/web/20070222133717/http://www.nessus.org/plugins/index.php?view=single&id=21725 on Aug. 13, 2024.

Nessus, "Plugins: The remote host is infected by a virus", webpage http://www.nessus.org/plugins/index.php?view=single&id=11329, 2 pages, Feb. 22, 2007, retrieved from Internet Archive Wayback Machine https://web.archive.org/web/20070222091638/http://www.nessus.org/plugins/index.php?view=single&id=11329 on Aug. 13, 2024.

Nessus, "Plugins: The remote host is infected by msblast.exe", webpage http://www.nessus.org/plugins/index.php?view=single&id=11818, 1 page, Sep. 24, 2006, retrieved from Internet Archive Wayback Machine https://web.archive.org/web/20060924205758/http://www.nessus.org/plugins/index.php?view=single&id=11818 on Aug. 13, 2024.

Representative Sample. Julie Young, Investopedia. Published Apr. 10, 2019 (Web Archive Aug. 19, 2019). Accessed on Aug. 19, 2024. [https://web.archive.org/web/20190819095403/https://www.investopedia.com/terms/r/representative-sample.asp].

Social-Engineer, LLC, "Social Engineering Using Maltego," webpage <www.youtube.com/watch?v=qiv4-wy3mxo>, 2 pages, Sep. 14, 2009, retrieved on Aug. 13, 2024.

Social-Engineer, LLC, Screen captures from "Social Engineering Using Maltego," webpage <www.youtube.com/watch?v=qiv4-wy3mxo>, 43 pages, Sep. 14, 2009.

Stoneburner, G. et al., "Risk Management Guide for Information Technology Systems," NIST, available at https://www.archives.gov/files/era/recompete/sp800-30.pdf, (Jul. 2002), 55 pages.

Tenable Network Security, Inc., "Nessus 3.0 Client Guide," available at http://nessus.org/documentation/nessus_3.0_client_guide.pdf, Mar. 6, 2007, 32 pages.

SYSTEMS AND METHODS FOR RAPIDLY GENERATING SECURITY RATINGS

CROSS-REFERENCE TO RELATED APPLICATIONS

This application is a Continuation of U.S. patent application Ser. No. 18/158,594 filed Jan. 24, 2023, which is a Continuation of U.S. patent application Ser. No. 17/132,512 titled "Systems and Methods for Rapidly Generating Security Ratings" and filed on Dec. 23, 2020, now issued as U.S. Pat. No. 11,595,427, which is a Divisional of U.S. patent application Ser. No. 16/779,437 titled "Systems and Methods for Rapidly Generating Security Ratings" and filed on Jan. 31, 2020, now issued as U.S. Pat. No. 10,893,067, each of which is hereby incorporated by reference herein in its entirety, and the subject matter of this application is related to the subject matter of U.S. patent application Ser. No. 15/377,574 titled "Methods and Systems for Creating, De-Duplicating, and Accessing Data Using an Object Storage System" and filed on Dec. 13, 2016 (now U.S. Pat. No. 9,705,932); U.S. patent application Ser. No. 14/021,585 titled "Security Risk Management" and filed on Sep. 9, 2013 (now U.S. Pat. No. 9,438,615); U.S. patent application Ser. No. 13/240,572 titled "Information Technology Security Assessment System" and filed on Sep. 22, 2011; U.S. patent application Ser. No. 14/944,484 titled "Information Technology Security Assessment System" and filed on Nov. 18, 2015 (now U.S. Pat. No. 9,973,524); U.S. patent application Ser. No. 15/142,677 titled "Security Assessment Using Service Provider Digital Asset Information" and filed on Apr. 29, 2016 (now U.S. Pat. No. 9,830,569); U.S. patent application Ser. No. 16/015,686 titled "Methods for Mapping IP Addresses and Domains to Organizations using User Activity Data" and filed on Jun. 22, 2018 (now U.S. Pat. No. 10,425,380); U.S. patent application Ser. No. 16/549,764 titled "Systems and Methods for Inferring Entity Relationships via Network Communications of Users or User Devices" and filed on Aug. 23, 2019; U.S. patent application Ser. No. 16/583,991 titled "Systems and Methods for Network Asset Discovery and Association thereof with Entities" and filed on Sep. 26, 2019; U.S. patent application Ser. No. 16/514,771 titled "Systems and methods for generating security improvement plans for entities" and filed on Jul. 17, 2019, each of which is hereby incorporated by reference herein in its entirety.

TECHNICAL FIELD

The present disclosure generally relates to methods and systems for rapidly indexing and querying a database implemented using an object storage system. Some embodiments described herein relate specifically to methods and systems for rapidly determining security ratings based on data stored in a database implemented using an object storage system.

BACKGROUND

Key-value databases associate a value or values with a unique primary key. Such databases generally support point queries, such as retrieving the value(s) associated with a single key. Key-value databases may also support range queries, such as retrieving values associated with a range of ordered keys. Further, such databases may support prefix queries, whereby values associated with keys having a specified prefix are retrieved.

Key-value databases are generally implemented using filesystems on low-latency storage media such as solid-state drives or high-performance, magnetic hard drives. These low-latency storage media options may achieve query execution times within an acceptable range for many applications. However, storing large volumes of data on these devices is costly, especially when data replication, fault-tolerance, and read scalability considerations are taken into account.

Object storage systems (e.g., Amazon S3, Google Cloud Storage, etc.) generally associate a key with a block of binary data (e.g., an object), which may be of arbitrary size. Object storage systems are generally capable of storing large volumes of data at relatively low cost and with extremely high reliability. Such systems are also generally capable of supporting high read request rates for each object stored.

Compared to filesystems, however, object stores may be understood to have several significant limitations. First, requests to object storage systems generally take place over networks, and therefore suffer much higher request latencies and lower bandwidth than requests to local filesystems. For example, a command that a local file system executes in 2 milliseconds may execute in 50 milliseconds on an object storage system. Second, objects stored in an object storage system are generally immutable. Thus, in contrast to filesystems, which generally permit stored files to be modified, an object storage system may not permit any changes to stored data objects. However, an object storage system may permit an existing key (already associated with a stored data object) to be assigned to a new object, and the system may return the new object rather than the old object when queried using the key shared by the new and old objects. Third, the memory consistency guarantees provided by object storage systems are generally weaker than those of filesystems. For example, when a new version of an existing object is associated with the key assigned to the old version of the object, subsequent reads or queries against that same key may return either version of the object.

SUMMARY

Many tools, including some tools used to rapidly produce evaluations (e.g., ratings) of the cybersecurity of an organization's network assets, would benefit greatly from the ability to make key-value point, range, and/or prefix queries into databases containing large quantities (e.g., trillions) of records with low latency (e.g., latencies of tens of milliseconds or less). Thus, there exists a current need for techniques for storing large volumes of key-value data on an object storage system, while overcoming the above-described limitations of existing object storage systems and providing acceptable query latency and throughput.

In general, one innovative aspect of the subject matter described in the present disclosure can be embodied in a system for generating security ratings, the system including a security database, an orchestrator module, and a ratings engine. The security database may include a manifest and a distributed index including a plurality of security records, wherein each of the security records includes a key and a value, each of the keys includes a network identifier of a network asset, and each of the values includes security information associated with the network asset identified by the key of the respective security record, wherein a keyspace of permissible values of the keys of the security records is partitioned into a plurality of key ranges, and wherein the manifest includes references to a plurality of segments of the distributed index, wherein the manifest and the segments are stored in an object storage system, wherein each of the segments is associated with a respective one of the key ranges and indexes a respective group of security records having keys within the associated key range. The orchestrator module may be configured to receive a request for a security rating of an entity, generate a query having a query key value matching a network identifier associated with the entity and/or network identifiers of a plurality of network assets of the entity, the query representing a request for each security record of the database having a respective key that matches the query key value, and submit the query to the security database, wherein the security database is configured to respond to the query by searching the manifest to identify one or more of the segments of the distributed index, each of the identified segments being associated with a respective key range that matches the query key value, and searching each of the identified segments of the distributed index to identify each of the security records having a respective key that matches the query key value; and a ratings engine configured to determine a security rating of the entity based on the identified security records.

Other embodiments of this aspect include corresponding methods, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the identified segments are searched in parallel. In some embodiments, each key in the keyspace belongs to exactly one of the partitions of the keyspace. In some embodiments, the system further includes a data collector configured to collect additional security information, generate additional security records including the additional security information, and store the additional security records in the security database. In some embodiments, the system further includes an automapper configured to identify entities associated with specified network assets.

In general, another innovative aspect of the subject matter described in the present disclosure can be embodied in a database writing method, including obtaining a plurality of records to be stored in a database, wherein each record includes a respective key and value, and wherein a keyspace of permissible keys for the records is partitioned into a plurality of key ranges; dividing the records into a plurality of groups, wherein a respective one of the key ranges is assigned to each group, and wherein all the records within each group have keys that fall within the key range assigned to the group; for each group of records, generating a respective segment of a distributed index of the database, wherein each segment is associated with the key range assigned to the group of records indexed by the segment, and wherein each segment is searchable to find records indexed by the segment having keys that match a key query; storing the segments as respective objects in an object storage system; generating a manifest of the distributed index, wherein the manifest is searchable to find segments associated with key ranges that match the key query; and storing the manifest as an object in the object storage system.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, each segment of the distributed index is implemented as a respective tree including one or more internal nodes and one or more leaf nodes. In some embodiments, a particular segment of the distributed index is associated with a particular key range, each of the internal nodes of the particular segment represents a respective subrange of keys within the particular key range, and each of the internal nodes includes a plurality of references to other nodes of the tree. In some embodiments, each of the leaf nodes of a particular segment of the distributed index includes the values of a respective subset of the group of records assigned to the particular segment. In some embodiments, each of the leaf nodes of a particular segment of the distributed index includes one or more references to locations in a respective data file of values of a respective subset of the group of records assigned to the particular segment, and the respective data file is distinct from a file including the nodes of the particular segment.

In some embodiments, the plurality of records is a first plurality of records, the segments are first segments, and the method further includes updating the database to include a second plurality of records by: generating one or more second segments to index the second plurality of records; and storing the second segments as respective objects in the object storage system. In some embodiments, the manifest is a first manifest, and updating the database to include the second plurality of records further includes: generating a second manifest, wherein the second manifest is searchable to find first and second segments associated with key ranges that match the key query; and storing the second manifest as an object in the object storage system.

In some embodiments, the segments of the distributed index include a plurality of segments associated with a particular key range, and the actions of the method further include compacting the plurality of segments associated with the particular key range, thereby reducing a total number of segments associated with the particular key range. In some embodiments, the key of a particular record includes a network identifier of a network asset, and the value of the particular record includes security information associated with the network asset.

In general, another innovative aspect of the subject matter described in the present disclosure can be embodied in a database reading method, including: receiving, by a database, a query indicating a query key value, wherein the database includes a plurality of records each including a respective key and value, wherein the keys of the records are drawn from a keyspace of permissible keys, and wherein the query represents a request for each record of the database having a respective key that matches the query key value;

searching a manifest of a distributed index of the database, wherein the manifest includes references to a plurality of segments of a distributed index, wherein the manifest and the segments are stored in an object storage system, wherein the keyspace is partitioned into a plurality of key ranges, wherein each of the segments is associated with a respective one of the key ranges and indexes a respective group of records having key values within the associated key range, and wherein the searching of the manifest identifies one or more of the segments of the distributed index, each of the identified segments being associated with a respective key range that matches the query key value; searching each of the identified segments of the distributed index to identify each record of the database having a respective key that matches the query key value; and providing the identified records to an issuer of the query.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the identified segments are searched in parallel. In some embodiments, each key in the keyspace belongs to exactly one of the partitions of the keyspace. In some embodiments, each segment of the distributed index is implemented as a respective tree including one or more internal nodes and one or more leaf nodes. In some embodiments, the internal nodes include ranges of keys and the leaf nodes include key-value pairs. In some embodiments, the key of a particular record includes a network identifier of a network asset, and the value of the particular record includes security information associated with the network asset.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

The present disclosure describes some embodiments of methods and techniques for implementing a database capable of efficiently storing and querying key-value pairs of records using an object storage system, rather than a traditional file system or distributed file system. According to some embodiments, the values represent externally observable evidence of cybersecurity incidents and observations of an entity's cybersecurity, and each key represents data that can be used to attribute such values to a particular entity. In some embodiments, each key may represent an IP address or domain name corresponding to a particular entity.

As used herein, the term "object storage system" may refer to a device or set of devices (e.g., a set of devices connected by a communication network) that manages data as objects. As discussed above, an object storage system generally associates keys with objects, which may be of arbitrary size. Object storage systems are generally capable of storing large volumes of data at relatively low cost and with high reliability, and are also generally capable of supporting high read request rates for stored objects. Objects stored in an object storage system are generally immutable, and may be stored in storage devices that are accessible via a communication network.

As used herein, the term "security rating" may refer to, for example, any absolute or relative ranking, listing, scoring, description, or classification of an entity with respect to characteristics of its security state, or any combination of the foregoing.

The present disclosure describes a novel architecture and related data structures for a database that stores its records in an object storage system. As described below, this database architecture and related data structures provide for significant improvements to computer-related technology, and constitute specific implementations of solutions to problems that arise with object storage systems and, more generally, database software. In other words, the disclosed database architecture and related data structures provide solutions to problems in the software arts. For example, the disclosed database architecture not only uses an object storage system to store database records, but also uses the disclosed data structures to improve upon the high request latencies that tend to occur in conventional databases implemented using object storage systems. In addition, the disclosed database architecture also improves upon issues related to memory consistency that have been historically problematic for databases implemented using object storage systems. Thus, the improved logical structures and processes described herein constitute improvements to computer-related technology for reasons similar to those articulated by the Federal Circuit in Enfish, LLC v. Microsoft Corp, and are not abstract ideas.

Figure 1:
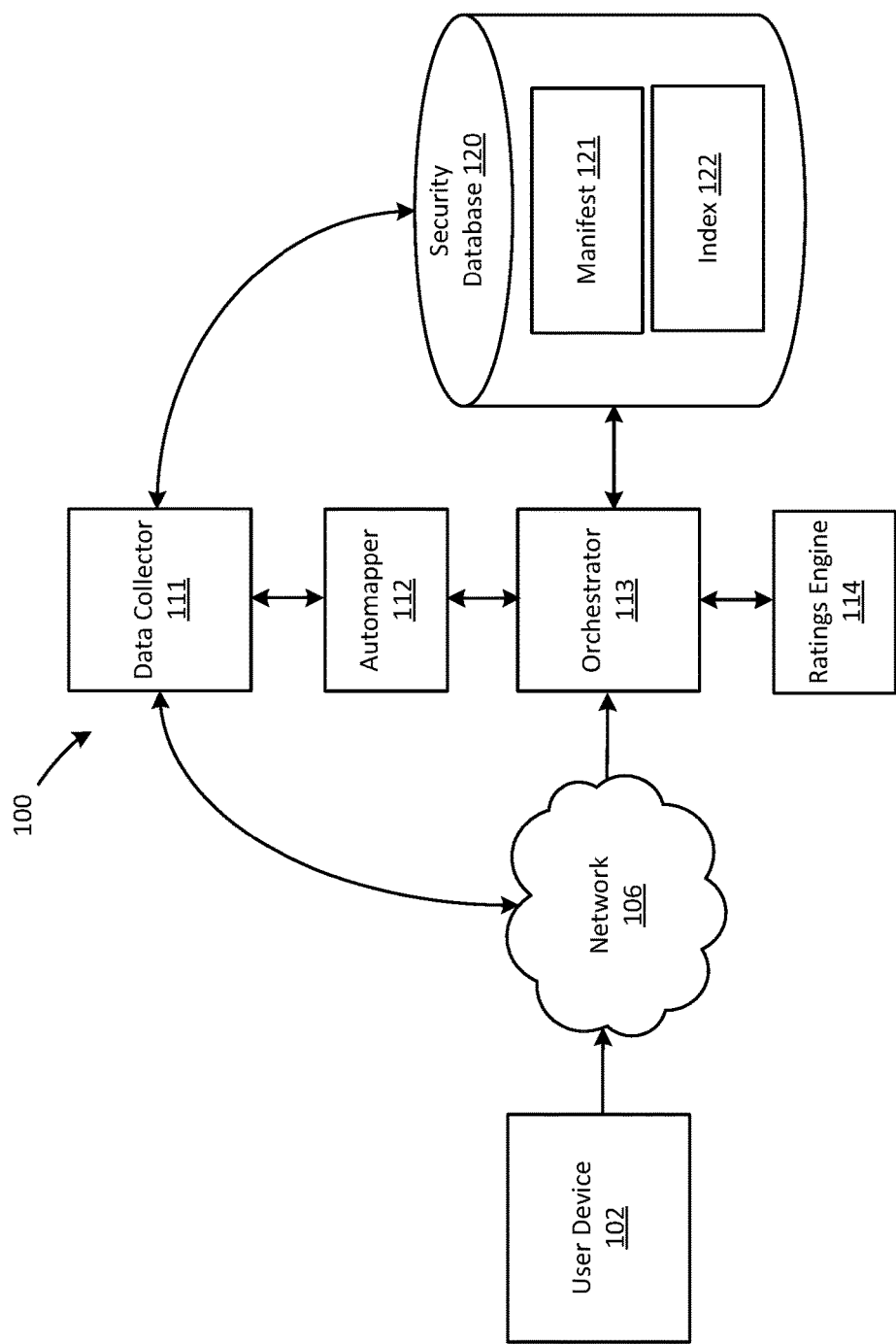
FIG. 1 depicts a block diagram of an example of a system for collecting, aggregating, and analyzing security event data, according to some embodiments.

FIG. 1 depicts a system 100 for collecting, aggregating, and analyzing security event data, according to some embodiments. In general, the system 100 may collect, aggregate, analyze, and further manage security risk data, such that the system may rapidly (e.g., in less than one minute) retrieve security data from a database and generate a security rating for an entity of interest (e.g., a company, other organization, or other entity). The system 100 may retrieve the security data and generate the security rating in response to receiving a suitable request from an end-user. According to some embodiments, the user may provide identification data to identify an entity of interest. The identification data may include one or more network identifiers corresponding to the entity of interest (e.g., data identifying network assets of the entity, for example, one or more hostnames, IP addresses, URLs). The system 100 may use a rapid automatic mapping process to identify other network assets corresponding to the entity.

For each identified network asset of the entity, the system 100 may retrieve a set of security-related events from a security database 120. This security database 120 may index data objects representing security events according to multiple fields, which may include (without limitation) IP addresses, hostnames, and/or URLs. The indexed data objects may be stored on a distributed object storage system. The architecture of the security database 120 may enable the system 100 to quickly retrieve security events matching an entity of interest (e.g., in milliseconds or tens of milliseconds), even when the security database is implemented using one or more server devices having low-cost hardware. In some cases, the retrieved data are augmented with additional network observations made at the time of the query to improve the freshness of the generated security rating.

Referring to FIG. 1, the system 100 may include a data collector 111, an automapper 112, an orchestrator 113, a ratings engine 114, and an object storage system 120. Some embodiments of the components of the system 100 are described in further detail below. Each of the components of the system 100 may be implemented as a suitable computer program executing on a suitable system.

The orchestrator 113 may receive requests for security information from user devices 102 of users of the system 100, and manage the system's responses to such requests. Any suitable security information may be requested, including (without limitation) the security ratings of entities of interest, information regarding security events associated with an entity of interest, among others. As described above, such requests may identify the entity of interest using any suitable identification data. In some embodiments, the orchestrator 113 prioritizes such requests (e.g., in an internal request queue) and coordinates with other system components (e.g., data collector 111, automapper 112, ratings engine 114, and/or security database 120) to identify network assets of the entity of interest, retrieve records of security events associated with the entity of interest, determine a security rating of the entity of interest, store (e.g., cache) the determined security rating, and/or generate a security report responsive to the request. The orchestrator may send the requested security information (e.g., the security rating and/or security report) to the user device 102 that requested it.

The orchestrator 113 may receive requests for security information (e.g., from user devices 102) and/or send requested security information (e.g., to user devices 102) via a communication network 106. Network 106 may include one or more wide area networks ("WANs") (e.g., the Internet), one or more local area networks ("LANs") (e.g., intranets), and/or one or more other networks of any type that supports communication between two or more electronic devices.

The orchestrator 113 may be implemented using any suitable software executing on any suitable computer system. In some embodiments, the orchestrator includes a server application executing on a computer system (e.g., a relatively small computing device) composed of commodity hardware.

Still referring to FIG. 1, the data collector 111 may collect information regarding network assets and/or security events by monitoring activity in the network 106. Such monitoring may be performed continually and/or in real time. The data collector 111 may obtain the information from any suitable data sources using any suitable techniques (e.g., HTTP requests, TCP connections, DNS queries, etc.). The collected information may include information characterizing various entities and/or relevant to the security of those entities' computer systems, including (without limitation) entities' names, addresses, web site addresses, and/or industry sectors; IP address ranges owned by or assigned to respective entities, etc. In some embodiments, the data collector 111 stores the collected information in the security database 120. Examples of implementations and features of some embodiments of the data collector 111 are described in U.S. patent application Ser. No. 13/240,572 (see discussion of data collection management system 18, data collection processing system 16, etc.).

Still referring to FIG. 1, the automapper 112 may identify network assets associated with an entity of interest, which entity may be identified using any suitable identification data. In some embodiments, the orchestrator 113 supplies the identification data to the automapper 112 and instructs the automapper 112 to identify the network assets of an entity of interest. For example, the supplied identification data may identify an initial set of network assets (e.g., one or more hostnames, IP addresses, or URLs) associated with an entity of interest, and the orchestrator 113 may instruct the automapper 112 to identify additional network assets associated with the entity of interest.

The automapper 112 may identify network assets of an entity using any suitable data and/or techniques, including (without limitation) previously curated data, domain name system (DNS) records, observations of DNS queries, data obtained from network registrars, observations of network traffic, links to web pages (e.g., HTML links), and/or legal records. In some embodiments, the automapper 112 obtains such data (e.g., previously curated data) from the security database 120. In some embodiments, the automapper 112 communicates with an Internet Assigned Numbers Authority (LANA) or Regional Internet Registry (RIR) to determine an Internet Protocol (IP) address range associated with an entity or a domain name. For example, the automapper 112 may determine a domain name for a website of an entity, retrieve the IP address of the website (e.g., the IP address assigned to the domain name) from a domain name server, and provide that IP address to the LANA. In response, the LANA may provide the automapper 112 with a range of IP addresses assigned to the same domain name or entity to which the IP address is assigned. The above-described IP address ranges may include one or more IP addresses. For example, when a single IP address is assigned to a domain name or entity, the IP address "range" may include only the single IP address.

The process of identifying the network assets of an entity ("mapping" the network assets to the entity) may be performed automatically, semi-automatically, or manually. Examples of implementations and features of some embodiments of the automapper 112 are described in U.S. patent application Ser. No. 14/021,585 (see discussion of "analysis system"), Ser. No. 16/015,686 (see discussion of "mapping system"), Ser. No. 16/549,764 (see discussion of "inferencing system"), and Ser. No. 16/583,991 (see discussion of "entity-asset association system").

Still referring to FIG. 1, the ratings engine 114 may generate security ratings for respective entities based on security information associated with the entity's network assets. In some embodiments, in response to receiving a request for the security rating of an entity, the orchestrator 113 retrieves security information associated with the entity's network assets from the security database 120 (or instructs the ratings engine 114 to retrieve said security information), and the ratings engine 114 determines the entity's security rating based on the retrieved security information.

In some embodiments, the ratings engine 114 may store a set of security ratings (e.g., recently determined security ratings and/or frequently queried security ratings) in a cache. Upon receipt of a request for an entity's security rating, the ratings engine 114 may check the cache to determine whether a security rating for the entity is stored in the cache and not stale. If so, the ratings engine 114 may return the cached security rating rather than recalculating the entity's security rating. If not, the ratings engine may retrieve the entity's security information from the security database 120 and calculate the entity's security rating based on the retrieved security information.

Examples of implementations and features of some embodiments of the ratings engine 114 are described in at least U.S. patent application Ser. No. 13/240,572 (see discussion of "ratings processing system," etc.), U.S. patent application Ser. No. 14/944,484, U.S. patent application Ser. No. 15/142,677, and U.S. patent application Ser. No. 16/514,771.

In some embodiments, the security characteristics of an entity's network(s) can be evaluated to assess the entity's cybersecurity states. Specifically, the security characteristics can be evaluated to determine the entity's security rating. The entity's security rating can be provided to the entity as a measure of that entity's risk of security breaches and/or past security record.

In some embodiments, the security rating for each individual entity can be determined. In some embodiments, for security ratings purposes in parent-child entity relationships (e.g., parent company and subsidiary company), a security rating associated with a particular entity may be associated with another associated entity (e.g., a parent or a child of that entity). In some embodiments, a security rating associated with a particular entity may be included in the determination of the security rating of other associated entities (e.g., a parent or a child of that entity).

In some embodiments, determining security risk of entities uses externally observable information as proxies for (i) the effectiveness of the overall security performance of the policies and controls that entity implements and exercises and/or (ii) the vulnerability of the entity to security risk. This externally observable information can be categorized into observable subject areas, or "vectors", which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised. Examples of subject areas ("vectors") may include:

i. an amount of capital investment in the security of the entity;
ii. a measure of employee training in the security of the entity;
iii. a measure of organization of entity personnel dedicated to information security;
iv. an amount of the entity's budget dedicated to information security;
v. a number and/or severity of botnet infection instances of a computer system associated with the entity;
vi. a number of spam propagation instances originating from a computer network associated with the entity;
vii. a number of malware servers associated with the entity;
viii. a number of potentially exploited devices associated with the entity;
ix. a number of hosts authorized to send emails on behalf of each domain associated with the entity;
x. a determination of whether a DomainKeys Identified Mail (DKIM) record exists for each domain associated with the entity and/or a key length of a public key associated with a Domain Name System (DNS) record of each domain associated with the entity;
xi. an evaluation of a Secure Sockets Layer (SSL) certificate and/or a Transport Layer Security (TLS) certificate associated with a computer system of the entity;
xii. a number and/or type of service of open ports of a computer network associated with the entity;
xiii. an evaluation of security-related fields of an header section of HTTP response messages of hosts associated with the entity;
xiv. a rate at which vulnerabilities are patched in a computer network associated with the entity;
xv. an evaluation of file sharing traffic originating from a computer network associated with the entity; and/or
xvi. a number of lost records and/or sensitivity of information in the lost records in a data breach of a computer system associated with the entity.

In some embodiments, received data for an entity can include two or more subject areas (e.g., of those listed above). In some cases, determining the security rating for an entity can include determining the relationship between the first subject area and the second subject area. This relationship can be stored in a database and accessed for use. For example, the number of botnet infections of an entity may be correlated with the number of potentially exploited devices associated with the entity. This correlation can be stored and referenced in the future. In some embodiments, the security characteristic of an entity is associated with, related to, or equal to the security rating of that entity (e.g., on a scale from 300 to 900, as provided by BitSight Technologies, Inc., Boston, MA).

In some embodiments, to compute the security ratings for an entity, obtained data pertaining to the IT assets owned by that entity may be aggregated. For example, IT assets can include the IP addresses controlled by the entity and obtained data can include the activity associated with those IP addresses. To determine externally observable information about IP address-based assets, one or more IP addresses can be associated with an entity. The data may be processed to determine additional information. For example, processing may yield a list of IP addresses for an entity that has demonstrated suspicious or malicious behavior or fails to follow best security practices for the given reference data point. Similar methods can be used for other types of assets, e.g., domain-based assets, or other information for which an asset can be determined to be associated to an organization. Using these techniques, information about that asset can be associated with the entity.

The exemplary security ratings systems and methods may be configured to account for differences in data sources and types. In some embodiments, each data source may have a potentially unique insight of an entity and, therefore, there can be two or more techniques used to take advantage of the respective data. Data source-specific modeling techniques may be applied to some or all of the data sources to demonstrate feasibility and validate the approach for each data source and modeling technique.

In some embodiments, the combination of two or more vectors may produce a security rating that reflects the effectiveness of an entity's security efforts. The determination of individual vectors and the overall security rating can be influenced by security best-practices as promoted by standardized and accepted cybersecurity frameworks. In some embodiments, evidence of security compromise can be used to understand the specific impact the individual vectors have on the security rating of the entity. For instance, correlation between sources of externally observed information can be used to determine the impact of vectors. For example, the vectors representing evidence of compromised workstations (owned or controlled by an entity) may represent a significant portion of the entity's ability to implement security controls correctly, and thus may influence the entity's security rating more than other types of information.

Still referring to FIG. 1, the security database 120 may store records of security information on an object storage system (e.g., a distributed object storage system). Each record may have a key and a value. The key may identify the entity or network asset to which the record's value pertains. The key may use any suitable identification data to identify the associated entity or network asset (e.g., hostname, IP address, other network identifier, etc.). The value may include any suitable information relating to the security of the entity or network asset. For example, a record's value may include data pertaining to externally observable evidence of compromise, cybersecurity incidents (e.g., botnet infections), and/or security diligence data (e.g., observations of aspects of an entity's cybersecurity posture, which may include but are not limited to SSL certificates found on an entity's network assets, open ports observed on the entity's network assets, etc.).

When records are added to the database, they may be stored in objects within the database's object storage system. Once an object is inserted into the security database 120, the object may be immutable, such that it may never be updated. One advantage of storing database records in immutable objects is that potential errors due to eventual consistency can be avoided. For example, read operations in the security database 120 may either succeed (and return consistent values) or fail (because the operation attempted to read a stale object), but may not appear to succeed whilst returning inconsistent values.

Further, the database 120 may be versioned and each version may be immutable. A versioned database has the advantage of multi-version concurrency control, meaning readers may consistently read from one version of the database while the database is being written to by another process. Multiple database versions also facilitate reversions to previous versions of the database if corruption occurs.

The security database 120 may include a manifest 121 and index 122, both of which are further described below. Like the records, the index may be stored in objects within the database's object storage system. Some embodiments of the index 122 described herein may be capable of working around the above-described limitations of object storage systems, while enabling new records to be efficiently added to the database 120 (e.g., at regular intervals) and enabling individual records (or sets of records associated with the same key) to be retrieved quickly.

The index 122 may be partitioned according to the range of key values. Range-partitioning the index 122 in this manner may enable the system 100 to generate the index 122 in parallel (e.g., on clusters of multiple computers). Within each partition of the index 122, the database records may be stored as key-value pairs organized in one or more segments. Each segment may include a key dictionary and a set of values. In some embodiments, a segment's key dictionary may be stored in a file (e.g., "dictionary file"), and the segment's set of values may be stored in a different file (e.g., "data file"). In some embodiments, the key dictionary may be organized as a tree (e.g., a B+ tree or any other suitable tree-based data structure).

Within a segment's data file, the values of the segment's records may be stored in sorted order according to the records' keys. In some embodiments, the dictionary translates each key into a byte offset within the sorted data file, which facilitates the retrieval of the record(s) associated with a given key without processing the entire data file. Furthermore, one advantage of sorting the records in this manner is that adjacent records tend to be similar, which makes the sorted data file highly compressible. Thus, in some embodiments, a segment's sorted records are grouped into blocks within the data file, each block is compressed, and the dictionary translates each key into a byte offset within the block-compressed data file.

As discussed above, the index 122 may be range-partitioned. The manifest 121 may comprise and/or function as a global partition map. For example, the manifest 121 may keep track of the range of keys assigned to each partition and may store the locations of the partitions (e.g., using pointers or any other suitable addressing technique). When the database receives a query for the records associated with a key K, the database controller may interrogate the manifest 121 to determine which partition $P_K$ of the index 122 contains the records associated with the query key K and where the partition $P_K$ is stored. The database controller may then query each segment in the partition $P_K$ for records associated with the query key K.

As discussed above, each segment may include a key dictionary, which may be stored in the object storage system of the database 120. Querying a segment may involve searching the segment's key dictionary. For example, if the key dictionary is organized as a tree, querying the key dictionary may involve traversing the tree (e.g., using a standard tree traversal algorithm suitable for the type of tree used to store the key dictionary). Conceptually, each link traversal within the key dictionary may involve dereferencing a pointer to locate the tree node to which the link points. When the key dictionary is stored in an object storage system, dereferencing a pointer to a tree node may involve requesting data from the object storage system over an internal network. However, in some embodiments, the key dictionaries are organized into relatively shallow trees (e.g., trees of two or three levels on average), and therefore the number of pointers dereferenced (and the number of network requests made to the object storage system) while traversing the key dictionary is also relatively low, yielding a modest latency for the task of searching the dictionary.

The architecture of the database facilitates parallel searching of the index, which can further improve the latency of individual queries and/or facilitate the performance of multiple key queries in parallel. For example, when performing an individual query, the different segments within a partition may be searched in parallel to further decrease the latency of the query. Likewise, when processing multiple queries, different partitions may be searched in parallel (e.g., to process different queries in parallel), and different segments within each partition may be searched in parallel (e.g., to process different queries within the same partition of the key range in parallel, or decrease the latency of an individual query within the query set). In addition, the database's query bandwidth may be improved by replicating the manifest 121 and the segments of the index 122 and distributing the replicas (e.g., to different computers of the underlying object data storage system).

The architecture of the database also facilitates rapid range queries (and prefix queries). As discussed above, the records within a segment are sorted in order according to their keys (and optionally compressed). Thus, range queries (or prefix queries) within a segment can be performed by locating the records $R_1$ associated with the first key $K_1$ in the query range, locating the records associated $R_N$ with the last key $K_N$ in the query range, and reading all the records between $R_1$ and $R_N$ from the segment's data file. Different segments within the partition may be searched in parallel to further decrease the latency of the range (or prefix) query. In cases where the keys targeted by a range (or prefix) query fall within the key ranges associated with two or more distinct partitions, those partitions may be searched in parallel to further decrease the latency of the range query. The rapid handling of range (or prefix) queries may be particularly beneficial in the context of searching for security records corresponding to an entity's network assets, because the set of network identifiers assigned to an entity's network assets often include one or more contiguous ranges of network identifiers and/or all the network identifiers corresponding to one or more network ID prefixes.

The architecture of the database 120 also facilitates the process of adding (e.g., regularly adding) new records to the index 122. Existing segments of the index 122 may be stored as objects in the object storage system of the database 120 and, as such, may be immutable. However, new records (e.g., new security information records associated with network assets for which the index 122 already stores one or more records, or new security information records associated with network assets of which the index 122 does not yet contain any records) may be added to the index 122 by creating a new segment that includes the new records and inserting the new segment into the index partitions corresponding to the new records' keys.

In some embodiments, the database controller may add new records to the index 122 in batches from time to time (e.g., regularly, periodically, etc.). When a batch of new records is ready to be stored in the index 122, the database controller may partition the new records into subsets based on their keys (e.g., using a map-reduce process) such that each subset corresponds to the key range of one of the index's partitions, create new segments containing each of the subsets of new records, and write the new segments to the corresponding partitions.

To reduce the latency of database queries, the database may perform a compaction process on each of the partitions from time to time (e.g., regularly, periodically, etc.), whereby at least some of the segments within each partition are merged into a single, new segment. In some embodiments, the segments within a partition may be organized hierarchically, with smaller segments (e.g., segments storing relatively fewer records and/or segments storing their records in trees having relatively fewer levels) being assigned to the lower levels of the hierarchy and larger segments (e.g., segments storing relatively more records and/or segments storing their records in trees having relatively more levels) being assigned to the higher levels of the hierarchy. In such embodiments, when the number of segments at the lowest level L0 of the partition's segment hierarchy exceeds a threshold number, the segments at level L0 may be merged (e.g., using an N-way sorted merge algorithm) into a new, larger segment, which may be inserted into the partition's segment hierarchy at the next higher level L1. Likewise, when the number of segments at the level L1 of the partition's segment hierarchy exceeds a threshold number, the segments at level L1 may be merged into a new, larger segment, which may be inserted into the partition's segment hierarchy at the next higher level L2, and so on. This hierarchical compaction process may allow the number of segments within each partition to grow logarithmically with the number of records in the partition, which confers the benefit of limiting the database's write amplification (the number of times each record is ultimately copied) to a logarithmic factor.

To maintain database consistency, the manifest 121 may be stored in a single atomic object within the database's underlying object storage system. One of ordinary skill in the art will appreciate that as new segments are added to the index (to accommodate storage of new records or through the compaction process), the new segments are not visible to clients of the database 120 until a new manifest 121 identifying the new segments is created and stored (e.g., "committed") to the object storage system. In addition, storing prior versions of the manifest in the underlying object storage system permits a form of multi-version concurrency control, such that database users can concurrently read from a consistent, current version of the database at the same time a background process assembles the next version of the database.

Writing to the Database

Figure 2:
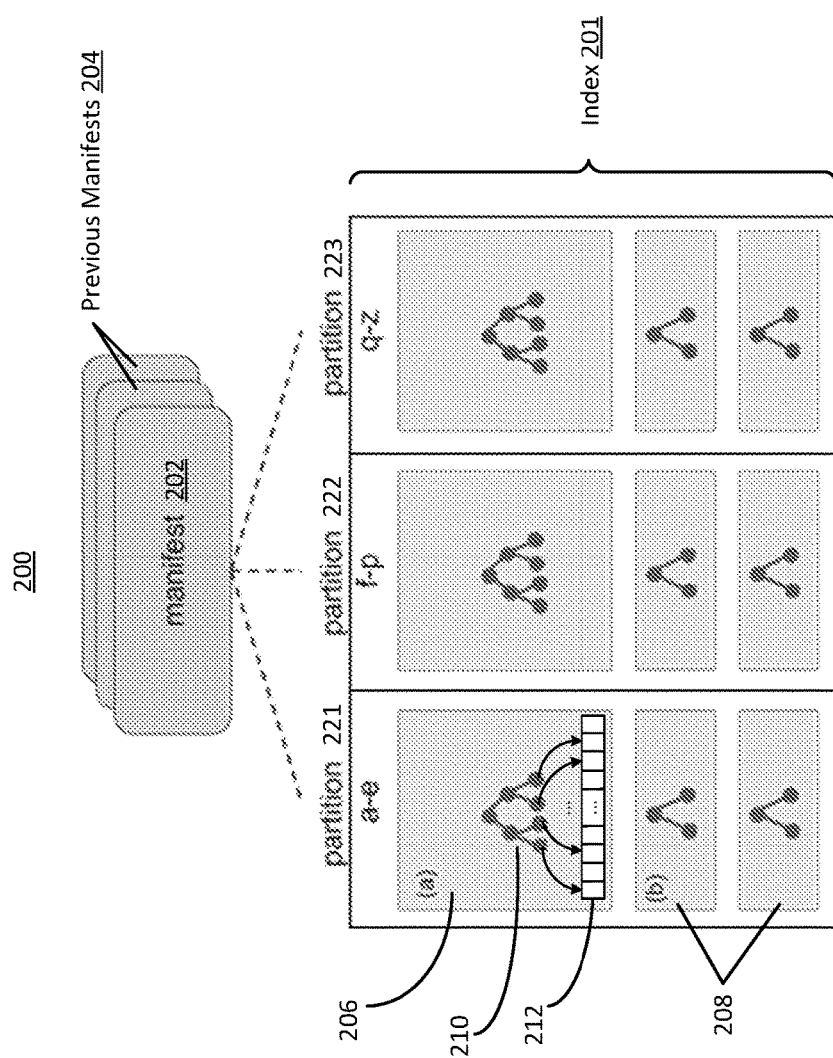
FIG. 2 depicts a block diagram of a database implemented using an object storage system, according to some embodiments.

Referring to FIG. 2, an example of a database 200 containing an index 201, a manifest 202, and one or more previous manifests 204 is shown. In the example of FIG. 2, the index 201 contains three partitions 221-223, each of which includes three segments. In the example, partition 221 stores records having the keys "a" through "e," partition 222 stores the records having the keys "f" through "p," and partition 223 stores the records having the keys "q" through "z".

In the example of FIG. 2, the current manifest 202 stores the key ranges associated with each partition and contains references to each of the partitions (e.g., references to all the segment objects within each partition). The previous manifests 204 may also be stored in the database. In some embodiments, each manifest may contain a unique key that indicates the manifest's version, and the database controller may refer to the manifest keys to distinguish the current manifest 202 from the previous manifests 204.

In the example of FIG. 2, each partition contains a larger segment 206, which may contain records that were added to the index at the time of its creation or records that were inserted into the segment 206 during a prior compaction process. In the example, each partition also contains two segments 208, which may contain records that were recently inserted into the index during a batch insertion process. As discussed above, each segment (e.g., segments 206, update segments 208) may include a data file 212 that stores the segment's records and a key dictionary 210 that indexes the records in the data file 212 (e.g., using a tree with references to records).

Database "readers" (e.g., processes that read data from the database 200) may use the key ranges in the current manifest 202 to first determine which partition (e.g., partition 221, partition 222, partition 223) to read. The reader may then examine all segments of the identified partition using, for example, the read process described below with reference to FIG. 5. In some embodiments, readers may return all records associated with a given key. In some embodiments, the records may contain version indicators (e.g., timestamps), and the readers may use the version indicators to select only the "current version" of the record.

An example of a process by which a database 200 may be constructed is now described. Records may be received (step 1) by the database 200. These records may be provided, for example, by a data collector 111 and/or an orchestrator 113, as described above. Each record may include externally observable evidence of one or more cybersecurity incidents and/or other observations of an entity's cybersecurity posture. For each record, a key and value may be computed. The keys may be used later, for example, to retrieve all values associated with one or more specified keys. In some cases, the keys may be used in determining which entities are affected by a particular cybersecurity observation or incident. According to some embodiments, the key is represented by a string of bytes of fixed or variable length. Any suitable process for computing the keys for the records may be used. The key computation process may generate keys such that a total ordering exists on the space of possible keys ("keyspace"). In some embodiments, the key contains a network identifier (e.g., an IP address or a domain name system (DNS) name) of a network asset. The record's value may be the original record itself, a portion of the original record, or a value derived from the original record, according to some embodiments.

To facilitate parallel processing of records on clusters of multiple computers, the keyspace of the records may be partitioned (step 2), such that each partition contains a certain range of keys, and each possible key belongs to exactly one partition. The partition ranges may be chosen to yield partitions that contain approximately equal numbers of the received records. According to some embodiments, the key ranges may be determined a priori if the keys are drawn from a known distribution. In some embodiments, the key ranges may be estimated by selecting a random sample of input records. Alternatively, the key ranges may be computed by sorting the entire set of records and dividing the sorted records into sets of roughly equal size.

The records may be partitioned and sorted (step 3). In some embodiments, the records are processed in batches on a distributed data processing system. Each batch of records may be divided into partitions according to key. The individual partitions of the various batches of records may be processed in parallel on clusters of multiple computers, using standard frameworks (e.g., the map reduce process) to reduce the overall time required for processing. Within each partition of each batch of records, the records may be sorted by key, according to some embodiments.

The partitioned, sorted records may then be inserted into segments (step 4). For each partition of each batch of records, an empty segment may be generated. The keys and values of the sorted records within each partition of each batch of records may then be inserted into the corresponding segment, which may be implemented using a data structure that facilitates efficient access to any randomly chosen key-value pair. This data structure may be a tree (e.g., a B+ tree or a tree similar to a B+ tree). In some embodiments, internal nodes of the tree may contain ranges of keys, and leaf nodes of the tree may contain key-value pairs. The number of keys per node of the tree may be chosen to optimize the number of nodes examined by a given query compared to the time required to retrieve a node. In some cases, the preferred number of keys per node is determined experimentally. For example, query performance for a set of queries (e.g., benchmark queries) may be observed as the number of keys "d" per node is varied, and the value of this parameter (d) that yields the best query performance may be selected. Alternatively, the preferred number of keys (d) per node may be estimated by minimizing the following expression:

$$t=(s+k*d/r)*\log(N)/\log(d+1),$$

where "t" is the query time, "k" is the size of a key in bytes, "r" is the network bandwidth in bytes/second, "s" is the round-trip network latency, and "N" is the number of nodes in the tree.

Figure 4:
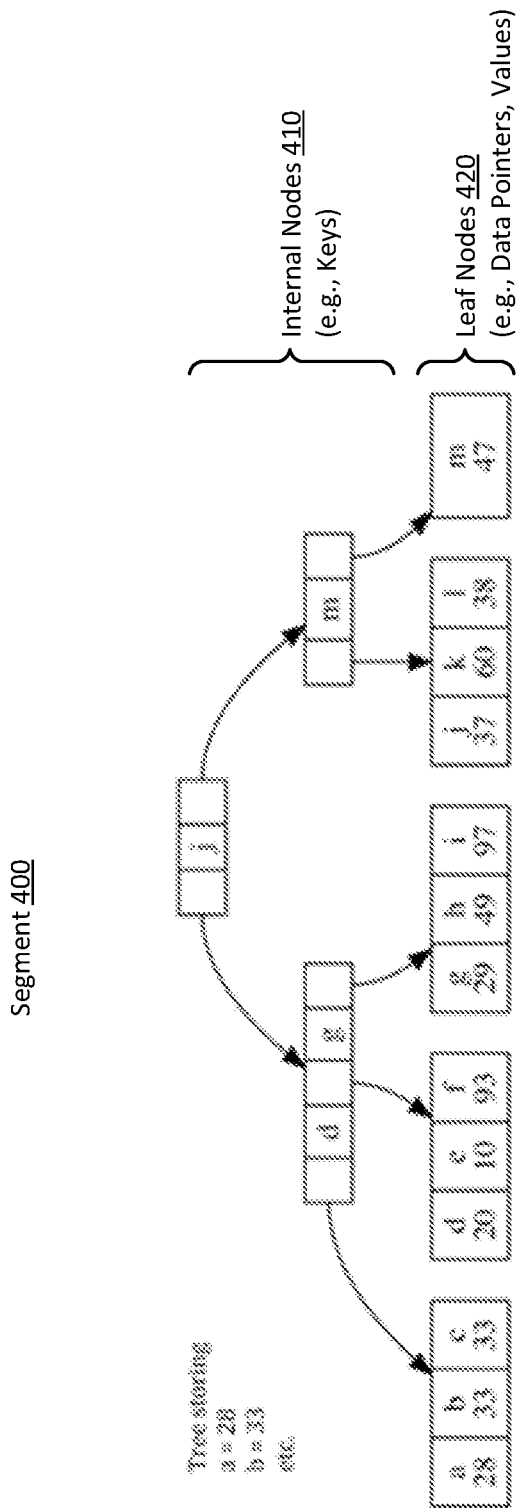
FIG. 4 depicts an example of a segment of a partition of a manifest of a database implemented using an object storage system, according to some embodiments.

FIG. 4 illustrates an example of a segment 400, according to some embodiments. In the example of FIG. 4, the segment 400 is represented by a tree data structure in which the top two tree levels consist of internal nodes 410 and the bottom level of the tree consists of leaf nodes. In the example of FIG. 4, the key-value pairs (e.g., key "a" and value "28") are stored in the tree's leaf nodes.

Alternatively, the keys of a segment's records may be stored in one structure (e.g., the key dictionary 210, which may be stored as an object), and the values of the segment's records may be stored in a separate structure (e.g., the data file 212, which may be stored as an object). In this case, the values in the key dictionary's underlying structure may be references (e.g., pointers or byte offsets) into the data file 212 containing the values of the segment's records. In some embodiments, the values of a segment's records may be organized in blocks and compressed to reduce the storage space occupied by the segment's data file 212. The block size of the blocks of the data file 212 may be chosen to optimize the tradeoff between the latency of requesting a single block and the time needed to transfer the data within the block and decompress the data. In some cases, the preferred block size is determined experimentally. For example, query performance for a set of queries (e.g., benchmark queries) may be observed as the block size "b" is varied, and the value of this parameter (b) that yields the best query performance may be selected. Alternatively, the preferred block size (b) may be estimated by minimizing the following expression:

$$t=(s+(b/r)+(b/z))*m,$$

where "t" is the query time, "s" is the round-trip network latency, "r" is the network bandwidth in bytes/second, "z" is the decompression bandwidth in bytes/second, and "m" is the number of blocks.

After all the records have been inserted into their corresponding segments, each partition of the database 200 may contain one or more segments. While all the keys within all segments of a given partition of the database 200 are within the key range assigned to that partition, there may be no other relation between the sets of keys stored within one segment of a partition and the sets of keys stored within another segment of the partition. Alternatively, the segments within a partition may contain disjoint ranges of a secondary key (e.g., a version indicator assigned to the record, for example, a timestamp of the record).

Figure 3:
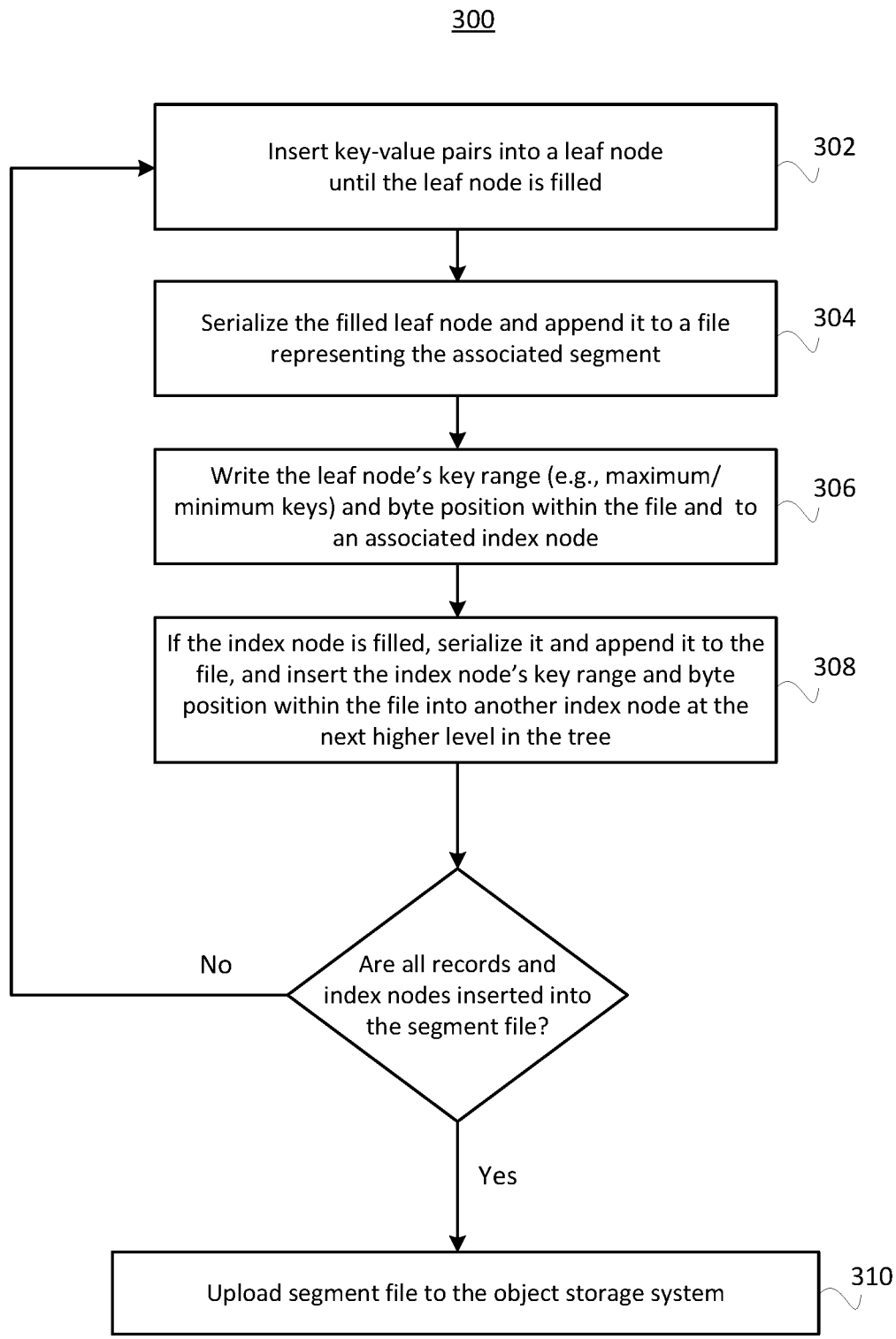
FIG. 3 depicts a flow chart of an exemplary method for storing new data records in a database implemented using an object storage system, according to some embodiments.

Referring to FIG. 3, a method 300 for efficiently constructing segments of a database 200 is shown, according to some embodiments. When records are inserted into a segment in accordance with the method 300, the segment may be written sequentially without requiring all records to be maintained in the writing computer's memory simultaneously. In step 302 of the method 300, key-value pairs may arrive at the "writer" (e.g., the process that inserts records into a segment) in key-sorted order, and the writer may insert the key-value pairs into a leaf node of the segment. In step 304, when the leaf node is filled, the writer may serialize the leaf node in binary format and append the serialized leaf node to a local file representing the segment. In step 306, the writer may observe the leaf node's byte position within the binary file and maximal/minimal key values, and store that information in an index node. At step 308, if the index node is full, the writer may serialize the index node and append it to the local file. In addition, the writer may insert the index node's position and key range into another index node at the next higher level in the tree. This process may be repeated until all records have been processed and all leaf nodes and index nodes have been inserted into the local file. Then, at step 310, the local file representing the segment may be uploaded to the object storage system.

The process of updating the security database 200 may involve not only the insertion of new segments into the distributed index 201, but also the creation of a new manifest 202. As described above, a manifest (e.g., current manifest 202, previous manifests 204) may store the key ranges of each partition of the keyspace (the universe of permissible key values) and also contain references to the segment objects within the partitions. Whenever the database is updated (e.g. by appending new segments to a partition), a new manifest may be constructed by reading the current manifest into memory, inserting new references to the new segments into the manifest, and inserting the manifest back into the object store under a new, distinct, version-indicating key. In this way, existing manifests (e.g., previous manifests 204) may remain immutable, such that the existing manifests are never modified.

The immutability of previous manifests 204 generally confers two benefits. First, any given manifest may represent a consistent snapshot view of the database, even if the database is concurrently being updated by another process. Thus, the immutability of previous manifests provides a form of multi-version concurrency control. A reader making a particular query using a particular manifest will always read the same records, regardless of subsequent updates (e.g., modifications) to the database. Second, it is possible to roll back the database to a previous state simply by referencing a previous version of the manifest.

An existing key-value pair in the database 200 may be updated by inserting a new record with the same primary key into the appropriate partition. Readers may read all versions of a record and discard all but the latest version. Subsequent compactions of the data store may remove older record versions, reducing storage space. Similarly, a record may be deleted by inserting a special deletion marker having the same primary key as the to-be-deleted record. According to some embodiments, an array of values, rather than a single value, may be associated with each key. As such, updates may append a value to the array of values associated with a given key.

The above-described batch process for inserting new data into the database by constructing new segments of the distributed index is generally very efficient, particularly in comparison to writing new data to the database by random insertions. (Since objects within the database's object storage system are immutable, modifying an existing record involves an inefficient process of downloading the entire object in which the record is stored, modifying the record in the downloaded object, and then uploading the modified object for storage as a new object.) In contrast, pursuant to the batch-based approach, from time to time new records may be collected, partitioned, and sorted by key using a parallel processing framework on clusters of multiple machines (e.g. map reduce). The new segments may be then inserted into the object storage system, and a new manifest may be constructed with references to both the previously existing and new segments as shown in FIG. 2. Read queries may examine all of the segments within a partition, according to some embodiments.

Reading from the Database

Figure 5:
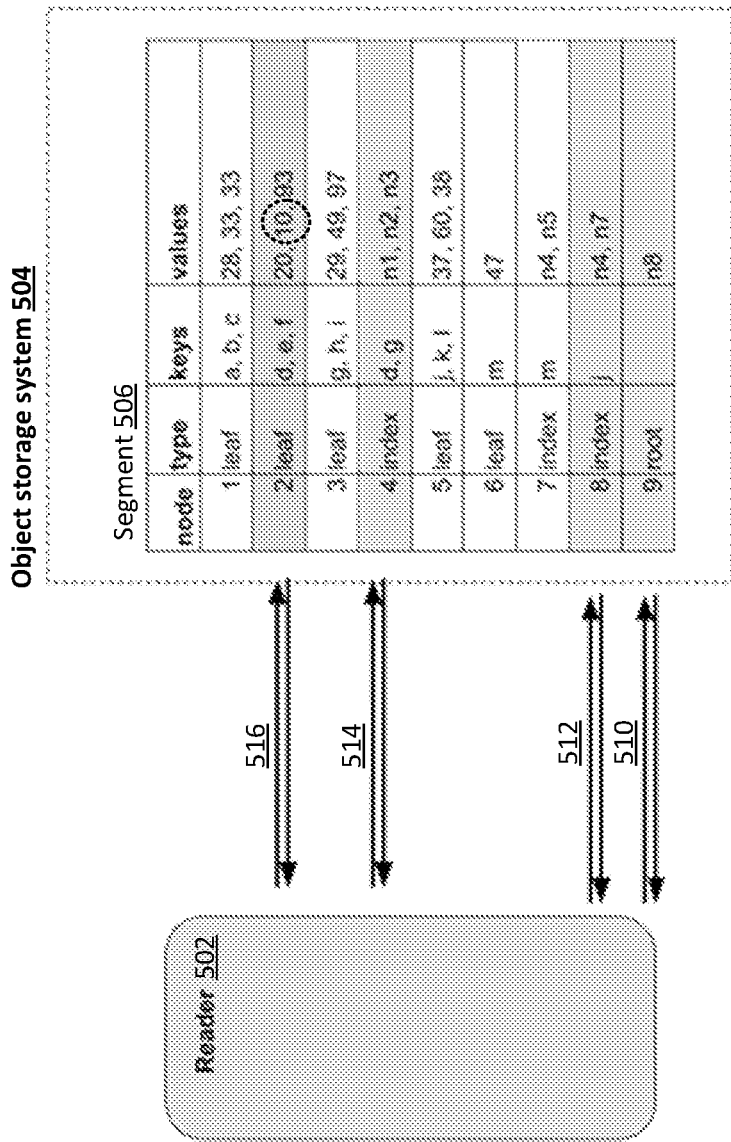
FIG. 5 depicts an example of a process by which a reader queries a database implemented using an object storage system, according to some embodiments.

FIG. 5 illustrates an example of dataflow and communication between a reader 502 and a segment 506 of a distributed index of a database during a process in which the reader 502 queries the database, according to some embodiments. In the example of FIG. 5, the segment 506 of the distributed index is stored as an object in an object storage system 504. The reader 502 may query the segment 506 for the value associated with a key (e.g., key 'e') stored in a single segment object 506. In the example of FIG. 5, the segment object 506 is a serialized version of the tree depicted in FIG. 4. In the example, the root node (e.g., node 9) is located in the last row of the serialized version of the segment 506. The root node and index nodes may contain pointers which represent the byte offsets of the start and length of other nodes. Each index node may contain a set of keys. A reader (e.g., reader 502) may use the sets of keys located in index nodes to determine how to traverse the tree to find the key-value pair(s) matching the query key. For example, the reader may use the sets of key located in the index nodes to determine which pointers to follow to read the next node during an orderly and efficient traversal of the tree. Pointers may be stored in the same order as keys, according to some embodiments. Similarly, the keys in leaf nodes may be stored in the same order as the values, according to some embodiments.

FIG. 5 illustrates an example of a process of querying the segment 506 for the key 'e'. In the example of FIG. 5, the shaded rows of the segment 506 represent the nodes of the segment 506 visited during a query for key 'e'. In this example, the root node has a known fixed length, and the reader 502 makes a ranged GET request (e.g., via HTTP or HTTPS) with the start of the range being equal to the object length minus the root node length (object length—root node length) and the end of the range being equal to the object length. Thus, the object store returns node 9. The foregoing request and response are represented by the paired arrows 510.

In this example, the reader 502 then examines the pointer in node 9 to determine the position and length of the next node to read. In this example, node 9 comprises a pointer to node 8 as shown in FIG. 5. Thus, the reader may make a second ranged GET request for the bytes representing node 8, and the object store may return node 8. The second request and response are represented by the paired arrows 512.

In this example, the reader then examines the keys in node 8, finds the insertion point of the target key 'e' in the key array of node 8 (in this case, the target key 'e' precedes sole key T stored in node 8, so the insertion point of the target key 'e' is the first insertion point in node 8), and reads the corresponding pointer to the next node, which, according to the values array, is node 4 as shown in FIG. 5.

In this example, the reader 502 then makes a third ranged GET request for bytes representing node 4, and the object store returns node 4 to the reader. The third request and response are represented by paired arrows 514. The reader 502 then examines the keys in node 4, finds the insertion point of the target key 'e' in the key array of node 4 (in this case, the target key 'e' is between the first key 'd' and the second key 'g' stored in node 4, so the insertion point of the target key 'e' is the second insertion point in node 4), and reads the corresponding pointer to node 2.

In this example, the reader then makes a fourth ranged GET request for the bytes representing node 2, and the object store returns node 2 to the reader. The fourth request and response are represented by the paired arrows 516. The reader then examines the key array of node 2 in search for the target key 'e' and finds a match at position 2 of the key array of node 2. Thus, the result of the query is the second value in the value array of node 2, which is 10.

More generally, to retrieve the value associated with a key (e.g., to make a point query), a reader may first examine the manifest object to determine which partition of the distributed index contains the key. The reader may then examine each segment within that partition. For each segment, the reader may traverse the structure used to implement the segment (e.g. B+ tree) by making requests (e.g., ranged HTTP(S) requests) over a network to the object storage system. The use of ranged requests may greatly reduce the latency of each query, because only the nodes of the segment retrieved pursuant to the ranged requests may be limited to the set of nodes relevant to the query, which generally represent a small fraction of the total data volume of the segment.

The time devoted to each network request may be determined by two factors. The first factor is the latency between the client and server (e.g., the round-trip time for a request to pass between the reader's device (e.g., the "client") and the database's device (e.g., the "server"). This latency may be independent from the size of the data requested. The second factor is the bandwidth of the network through which the client and server communicate (e.g., the number of bytes per second which can be transferred over the network). The size of the nodes within a segment and the number of keys within a node (also known in the art as "the branching factor") may be chosen to achieve the minimum possible query time by optimizing the total number of requests (e.g., latency) against the total data transferred (e.g., bandwidth).

To make a range query (e.g., retrieve all values for keys falling within a specified range of keys), the reader may first locate the first key-value pair in the segment(s) of the appropriate partition of the distributed index using the traversal process described above with reference to FIG. 5. The reader may then continue to read key-value pairs sequentially from the segment(s) until the reader encounters a key that is out of range or the end of the segment. If the reader reaches the end of the segment, the range query process may continue in the adjacent partition.

Similarly, to make a prefix query, the reader may first locate the smallest key that matches the given prefix. The reader may then continue to read key-value pairs until it encounters a key whose prefix does not match the prefix query.

To improve throughput, a concurrent reader may be used to make queries. While a standard reader scans through each segment for a given partition sequentially, the concurrent reader may scan N segments simultaneously, where N is a tuning parameter determined by the system or provided by the user. To facilitate concurrent segment scans, the concurrent reader may first read the manifest to determine which segments are available to scan for a given partition. After constructing the segment list, the concurrent reader may create M scanners, where M is a tuning parameter determined by the system or provided by the user. If there are not enough scanners to support reading all the relevant segments in parallel, the concurrent reader may distribute (e.g., evenly distribute) the remaining segments among the scanners.

These scanners may be implemented using separate threads in a single-node environment, or using separate devices in a distributed environment. Once initialized, the scanners may be able to read their assigned segments in parallel, with the concurrent reader collecting the results either on disk or in memory. In addition to collecting the results, the concurrent reader may also monitor for any scanners which may need to continue scanning at the next partition. If any scanners need to continue scanning at a subsequent partition, the concurrent reader may repeat the initial process of building the segment list and distributing segments to the scanners. This process may repeat until all of the relevant data have been scanned by the reader.

Compacting the Distributed Index of the Database

Figure 6:
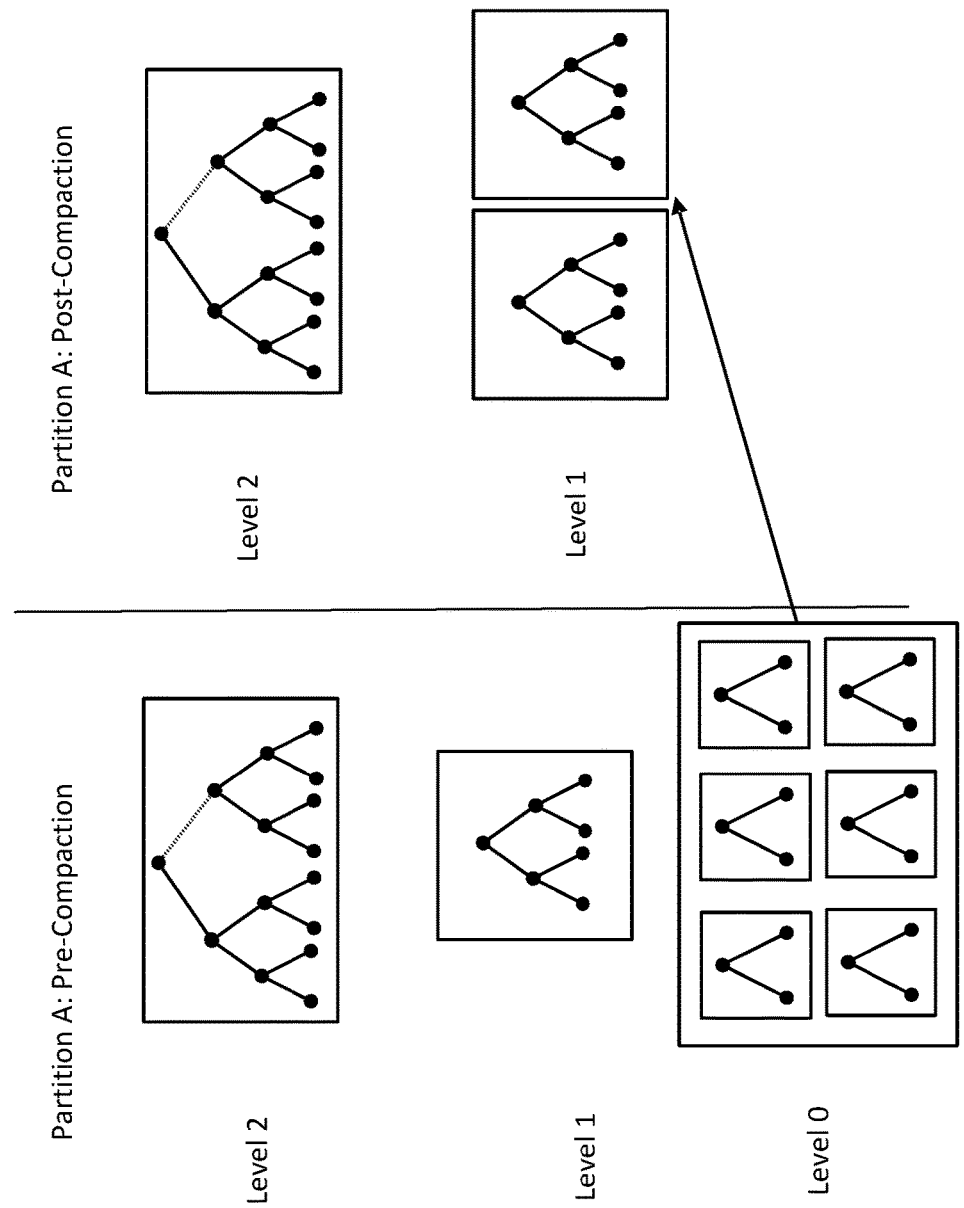
FIG. 6 depicts an example of a compaction process of a database implemented using an object storage system, according to some embodiments.

FIG. 6 illustrates an example of an index compaction process, according to some embodiments. To improve the performance of queries, the segments within a given partition may be compacted using such a compaction process, to reduce the total number of segments and to merge updates or deletions for each key.

The compaction process may begin by reading the manifest to obtain the full list of partitions and the segments contained therein. The compaction process may then iterate through each partition, using one or more scanners to perform a full scan of each of the segments contained within each partition. Similar to the above-described version filter of a reader, the compaction process may invoke a version filter on the scanned records. This version filter may allow the compaction process to discard all outdated record versions.

Upon completion of the read operation, the compaction process may create a single new segment in the object store. This new segment may then be updated with all of the records that passed through the compaction filter. Once the compaction process has completed writing the records into the new segment, it will atomically update the manifest by removing a reference to the existing segments and inserting a reference to the newly compacted segment.

When there is a large volume of data in the object store, it may be impractical for the compaction process to perform a full compaction over every partition listed in the manifest. Additionally, compactions over older and larger segments tend to have diminishing returns, as the records in those segments are not typically updated with the same frequency as more recent segments. Therefore, the compaction process may be adapted to only compact a subset of the total partitions in the manifest, and/or a subset of the segments within various partitions, according to some embodiments.

According to some embodiments, the compaction process begins by selecting 1/P of the total partitions in the object store for compaction. By using a deterministic round-robin strategy, compaction may be guaranteed to compact the total set of partitions within a timeframe determined by both the value of P and the schedule of the compaction process. Once a set of partitions has been selected, the compaction process may then select from the set of segments assigned to those partitions. The compaction process may determine which segments to select based on the following factors: (1) how often the records in that segment have been compacted, and/or (2) the total number of segments available for compaction.

To determine how often a segment has been compacted, the compaction process may store a numerical value alongside each segment in the manifest. This value (the "level), may indicate how many times the segment has been compacted. A brand new segment may therefore have a level value of zero, while a segment compacted twice may have a value of two as shown in FIG. 6.

According to some embodiments, the default compaction strategy, leveled compaction, uses these level values to balance the work that any given compaction process performs. The compaction process may select all level zero segments for a set of partitions, according to some embodiments. These segments are typically numerous and relatively small, making them excellent targets for compaction. In addition to the level zero segments, a user may also choose to allow for additional levels to be compacted by selecting various thresholds, such as total number of segments or segment sizes. By using these compaction levels, users can create compaction schedules according to their application requirements (e.g., performing larger compactions out-of-band, frequent processing of level zero segments, etc.).

Further Description of Some Embodiments

Some examples have been described in which databases having improved database architectures as described herein are used by a security rating system to rapidly generate security ratings for entities. However, the database techniques described herein may be advantageously used in other contexts. In general, these techniques may provide performance benefits for any applications in which high speed, high bandwidth, highly reliable access to a large database is desired and the use of low cost devices to host the database is preferred.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 7:
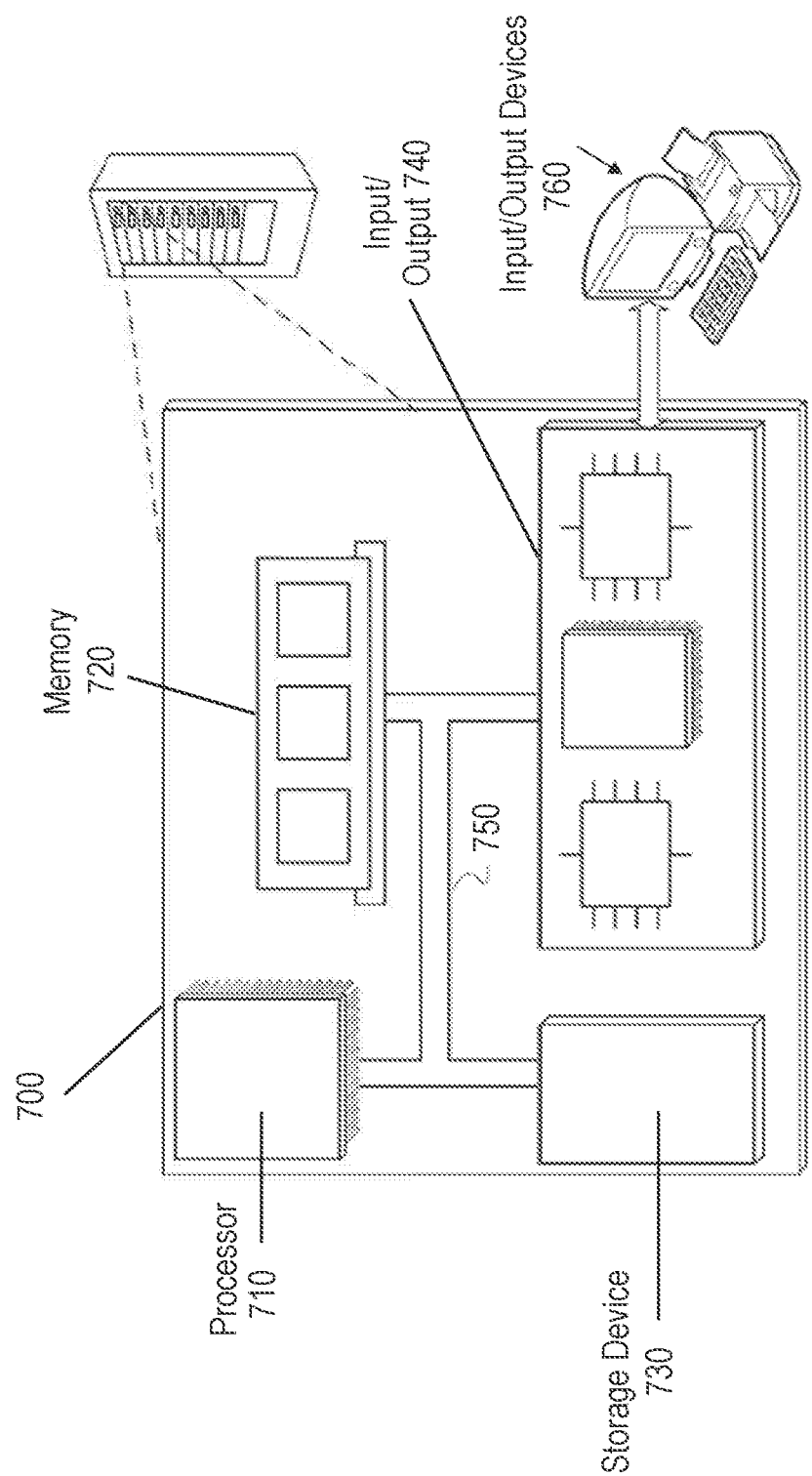
FIG. 7 is a diagram of an example computer system that may be used in implementing some embodiments of the systems and methods described herein.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 610 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, such as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, an engine, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A database reading method, comprising:
   sending, to a database, a query indicating a query key value, wherein the database comprises a plurality of records each comprising a respective key and value, wherein the keys of the records are drawn from a keyspace of permissible keys, wherein the query represents a request for each record of the database having a respective key that matches the query key value, wherein the key of a particular record comprises a network identifier of a network asset, and wherein the value of the particular record comprises security information associated with the network asset;
   searching a manifest of a distributed index of the database, wherein the manifest comprises references to a plurality of segments of the distributed index, wherein the manifest and the segments are stored in an object storage system, wherein the keyspace is partitioned into a plurality of key ranges, wherein each of the segments is associated with a respective one of the key ranges, and wherein the searching of the manifest identifies one or more of the segments of the distributed index, each of the identified segments being associated with a respective key range that matches the query key value;
   searching each of the identified segments of the distributed index to identify each record of the database having a respective key that matches the query key value; and
   providing the identified records to an issuer of the query.

2. The method of claim 1, wherein the identified segments are searched in parallel.

3. The method of claim 2, wherein each key in the keyspace belongs to exactly one of the partitions of the keyspace.

4. The method of claim 1, wherein each segment of the distributed index is implemented as a respective tree comprising one or more internal nodes and one or more leaf nodes.

5. The method of claim 4, wherein the internal nodes comprise the key ranges and the leaf nodes comprise key-value pairs.

6. A system for database reading, comprising:
one or more computing systems programmed to perform operations comprising:
  sending, to a database, a query indicating a query key value, wherein the database comprises a plurality of records each comprising a respective key and value, wherein the keys of the records are drawn from a keyspace of permissible keys, wherein the query represents a request for each record of the database having a respective key that matches the query key value, wherein the key of a particular record comprises a network identifier of a network asset, and wherein the value of the particular record comprises security information associated with the network asset;
  searching a manifest of a distributed index of the database, wherein the manifest comprises references to a plurality of segments of the distributed index, wherein the manifest and the segments are stored in an object storage system, wherein the keyspace is partitioned into a plurality of key ranges, wherein each of the segments is associated with a respective one of the key ranges, and wherein the searching of the manifest identifies one or more of the segments of the distributed index, each of the identified segments being associated with a respective key range that matches the query key value;
  searching each of the identified segments of the distributed index to identify each record of the database having a respective key that matches the query key value; and
  providing the identified records to an issuer of the query.

7. The system of claim 6, wherein the identified segments are searched in parallel.

8. The system of claim 7, wherein each key in the keyspace belongs to exactly one of the partitions of the keyspace.

9. The system of claim 6, wherein each segment of the distributed index is implemented as a respective tree comprising one or more internal nodes and one or more leaf nodes.

10. The system of claim 9, wherein the internal nodes comprise the key ranges and the leaf nodes comprise key-value pairs.

* * * * *